United States Patent
Cho

(10) Patent No.: US 11,579,782 B2
(45) Date of Patent: Feb. 14, 2023

(54) STORAGE CONTROLLER AND AN OPERATION METHOD OF THE STORAGE CONTROLLER

(71) Applicant: SAMSUNG ELECTRONICS CO., LTD., Suwon-si (KR)

(72) Inventor: Youngjin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 17/225,710

(22) Filed: Apr. 8, 2021

(65) Prior Publication Data

US 2022/0019357 A1 Jan. 20, 2022

(30) Foreign Application Priority Data

Jul. 15, 2020 (KR) .................. 10-2020-0087379

(51) Int. Cl.
*G06F 3/06* (2006.01)
*G06F 12/06* (2006.01)
*G06F 12/02* (2006.01)

(52) U.S. Cl.
CPC .......... *G06F 3/0623* (2013.01); *G06F 3/0614* (2013.01); *G06F 3/0632* (2013.01);
(Continued)

(58) Field of Classification Search
CPC .... G06F 3/0623; G06F 3/0614; G06F 3/0632; G06F 3/0656; G06F 3/0659; G06F 3/0679; G06F 12/0246; G06F 12/0646; G06F 2212/7201; G06F 3/061; G06F 3/0688; G06F 3/0604; G06F 3/0658; G06F 2212/1016
See application file for complete search history.

(56) References Cited

U.S. PATENT DOCUMENTS 8,219,776 B2 7/2012 Forhan et al.
8,301,861 B2 10/2012 Reiter et al.
(Continued)

FOREIGN PATENT DOCUMENTS

| CN | 107885667 | 4/2018 |
|---|---|---|
| JP | 6148763 | 6/2017 |
| KR | 10-2016-0146506 | 12/2016 |

*Primary Examiner* — Michael Krofcheck
(74) *Attorney, Agent, or Firm* — F. Chau & Associates, LLC

(57) ABSTRACT

A storage controller including: a host interface circuit receiving first, second, third and fourth requests corresponding to first, second, third and fourth logical addresses; a memory interface circuit communicating with first nonvolatile memories through a first channel and second nonvolatile memories through a second channel; a first flash translation layer configured to manage the first nonvolatile memories; and a second flash translation layer configured to manage the second nonvolatile memories, the first flash translation layer outputs commands corresponding to the first and fourth requests through the first channel, and the second flash translation layer outputs commands respectively corresponding to the second and third requests through the second channel, and a value of the first logical address is smaller than a value of the second logical address, and a value of the third logical address is smaller than a value of the fourth logical address.

18 Claims, 26 Drawing Sheets

(52) U.S. Cl.
CPC .......... *G06F 3/0656* (2013.01); *G06F 3/0659* (2013.01); *G06F 3/0679* (2013.01); *G06F 12/0246* (2013.01); *G06F 12/0646* (2013.01)

(56) References Cited

U.S. PATENT DOCUMENTS

| | | | |
|---|---|---|---|
| 9,053,013 | B2 | 6/2015 | Zhang et al. |
| 9,582,439 | B2 | 2/2017 | Jo |
| 10,121,013 | B2 | 11/2018 | Chang et al. |
| 10,123,231 | B2 | 11/2018 | Han et al. |
| 2007/0050535 | A1* | 3/2007 | Nelson ............... G06F 12/0246 711/E12.008 |
| 2007/0297605 | A1* | 12/2007 | Muraoka ................ G06F 21/85 711/E12.092 |
| 2011/0022779 | A1* | 1/2011 | Lund ................... G06F 12/0246 711/170 |
| 2018/0150389 | A1* | 5/2018 | Bhargava ............ G06F 12/0238 |
| 2018/0188962 | A1* | 7/2018 | Ji ........................ G06F 12/0607 |
| 2019/0052327 | A1 | 2/2019 | Motozuka et al. |
| 2019/0370169 | A1 | 12/2019 | Amato |
| 2020/0142744 | A1 | 5/2020 | Tolstsikau et al. |

\* cited by examiner

FIG. 12A

| Group | PL0 | | | | PL1 | | | | PL2 | | | | PL3 | | | |
|---|---|---|---|---|---|---|---|---|---|---|---|---|---|---|---|---|
| | L | C | | M | L | C | | M | L | C | | M | L | C | | M |
| 0 | 0 | 16 | | 32 | 4 | 20 | | 36 | 8 | 24 | | 40 | 12 | 28 | | 44 |
| 1 | 1 | 17 | | 33 | 5 | 21 | | 37 | 9 | 25 | | 41 | 13 | 29 | | 45 |
| 2 | 2 | 18 | | 34 | 6 | 22 | | 38 | 10 | 26 | | 42 | 14 | 30 | | 46 |
| 3 | 3 | 19 | | 35 | 7 | 23 | | 39 | 11 | 27 | | 43 | 15 | 31 | | 47 |

FIG. 12B

| Group | PL0 | | | | PL1 | | | | PL2 | | | | PL3 | | | |
|---|---|---|---|---|---|---|---|---|---|---|---|---|---|---|---|---|
| | L | C | | M | L | C | | M | L | C | | M | L | C | | M |
| 0 | 0 | 19 | | 35 | 7 | 22 | | 36 | 10 | 25 | | 41 | 13 | 28 | | 46 |
| 1 | 1 | 16 | | 34 | 4 | 23 | | 39 | 11 | 26 | | 40 | 14 | 29 | | 45 |
| 2 | 2 | 17 | | 33 | 5 | 20 | | 38 | 8 | 27 | | 43 | 15 | 30 | | 44 |
| 3 | 3 | 18 | | 32 | 6 | 21 | | 37 | 9 | 24 | | 42 | 12 | 31 | | 47 |

STORAGE CONTROLLER AND AN OPERATION METHOD OF THE STORAGE CONTROLLER

CROSS-REFERENCE TO RELATED APPLICATION

This application claims priority under 35 U.S.C. § 119 to Korean Patent Application No. 10-2020-0087379 filed on Jul. 15, 2020, in the Korean Intellectual Property Office, the disclosure of which is incorporated by reference herein in its entirety.

TECHNICAL FIELD

Example embodiments of the inventive concept relate to a semiconductor memory, and more particularly, to a storage controller and an operation method of the storage controller.

DISCUSSION OF RELATED ART

Semiconductor memories are classified into volatile memory devices and nonvolatile memory devices. Volatile memory devices lose data when a power supply voltage is interrupted. Examples of volatile memory devices include a static random access memory (SRAM), a dynamic RAM (DRAM), and a synchronous DRAM (SDRAM). Nonvolatile memory devices retain data even when power is removed. Examples of nonvolatile memory devices include a read only memory (ROM), a programmable ROM (PROM), an electrically programmable ROM (EPROM), an electrically erasable and programmable ROM (EFPROM), a flash memory device, a phase-change RAM (PRAM), a magnetic RAM (MRAM), a resistive RAM (RRAM), and a ferroelectric RAM (FRAM).

A storage device may include a plurality of nonvolatile memory devices. The storage device may distribute and store data in the plurality of nonvolatile memory devices. An example data management technique employed by the storage device is called "data interleaving". To maximize the deserialization of the nonvolatile memory devices, the storage device may distribute and allocate consecutive logical memory areas to a channel, a way, and a plane. According to this distribution technique, data of a specific pattern may be mainly focused on a specific channel. This, however, may cause a reduction in performance of the storage device.

SUMMARY

According to an example embodiment of the inventive concept, there is provided a storage controller including: a host interface circuit configured to receive a first request, a second request, a third request, and a fourth request respectively corresponding to a first logical address, a second logical address, a third logical address, and a fourth logical address from a host device; a memory interface circuit configured to communicate with one or more first nonvolatile memories through at least one first channel and communicate with one or more second nonvolatile memories through at least one second channel; a first flash translation layer configured to manage the one or more first nonvolatile memories; and a second flash translation layer configured to manage the one or more second nonvolatile memories, wherein the first flash translation layer outputs commands respectively corresponding to the first and fourth requests through the at least one first channel, and the second flash translation layer outputs commands respectively corresponding to the second and third requests through the at least one second channel, and wherein a value of the first logical address is smaller than a value of the second logical address, and a value of the third logical address is smaller than a value of the fourth logical address.

According to an example embodiment of the inventive concept, there is provided an operation method of a storage controller, the method including: receiving a write request including a logical address from a host device, the logical address including a first address part, a second address part, and a third address part; performing an XOR operation on the first address part and a seed to generate a first intermediate value; performing a hash operation on the first intermediate value to generate a second intermediate value; performing an XOR operation on the second intermediate value and the second address part to generate a scrambled second address part; and outputting a command corresponding to the write request based on the scrambled second address part to a first nonvolatile memory through a first channel or to a second nonvolatile memory through a second channel.

According to an example embodiment of the inventive concept, there is provided a storage controller including: a host interface circuit configured to receive a request including a logical address from an external host device; a memory interface circuit configured to communicate with one or more first nonvolatile memories through at least one first channel and communicate with one or more second nonvolatile memories through at least one second channel; and a scramble circuit, wherein the logical address includes a first address part, a second address part, and a third address part, wherein the scramble circuit includes: a first XOR operator configured to perform a logical operation on the first address part and a seed to generate a first intermediate value; a hash module configured to perform a hash function operation on the first intermediate value to generate a second intermediate value; and a second XOR operator configured to perform a logical operation on the second intermediate value and the second address part to generate a scrambled second address part, wherein the scramble circuit generates a result value by performing a modulo operation on the scrambled second address part based on a number of flash translation layers, wherein, when the result value is a first value, the scramble circuit outputs a command corresponding to the request to the at least one first channel, and wherein, when the result value is a second value, the scramble circuit outputs the command corresponding to the request to the at least one second channel.

According to an example embodiment of the inventive concept, there is provided a storage controller including: a host interface circuit receiving a write request including a logical address from a host device, the logical address including a first address part, a second address part, and a third address part; a first XOR circuit performing an XOR operation on the first address part and a seed to generate a first intermediate value; a hash circuit performing a hash operation on the first intermediate value to generate a second intermediate value; a second XOR circuit performing an XOR operation on the second intermediate value and the second address part to generate a scrambled second address part; and a memory interface circuit outputting a command corresponding to the write request based on the scrambled second address part to a first nonvolatile memory through a first channel or to a second nonvolatile memory through a second channel.

BRIEF DESCRIPTION OF THE FIGURES

The above and other features of the inventive concept will become apparent by describing in detail example embodiments thereof with reference to the accompanying drawings. In the drawings, like reference numerals may refer to like elements.

FIG. 12A is a diagram illustrating an order of storing data in a modulo manner.

FIG. 12B is a diagram illustrating an order of storing data, according to an example embodiment of the inventive concept.

DETAILED DESCRIPTION OF THE EMBODIMENTS

Below, example embodiments of the inventive concept will be described in detail with reference to the accompanying drawings.

Figure 1:
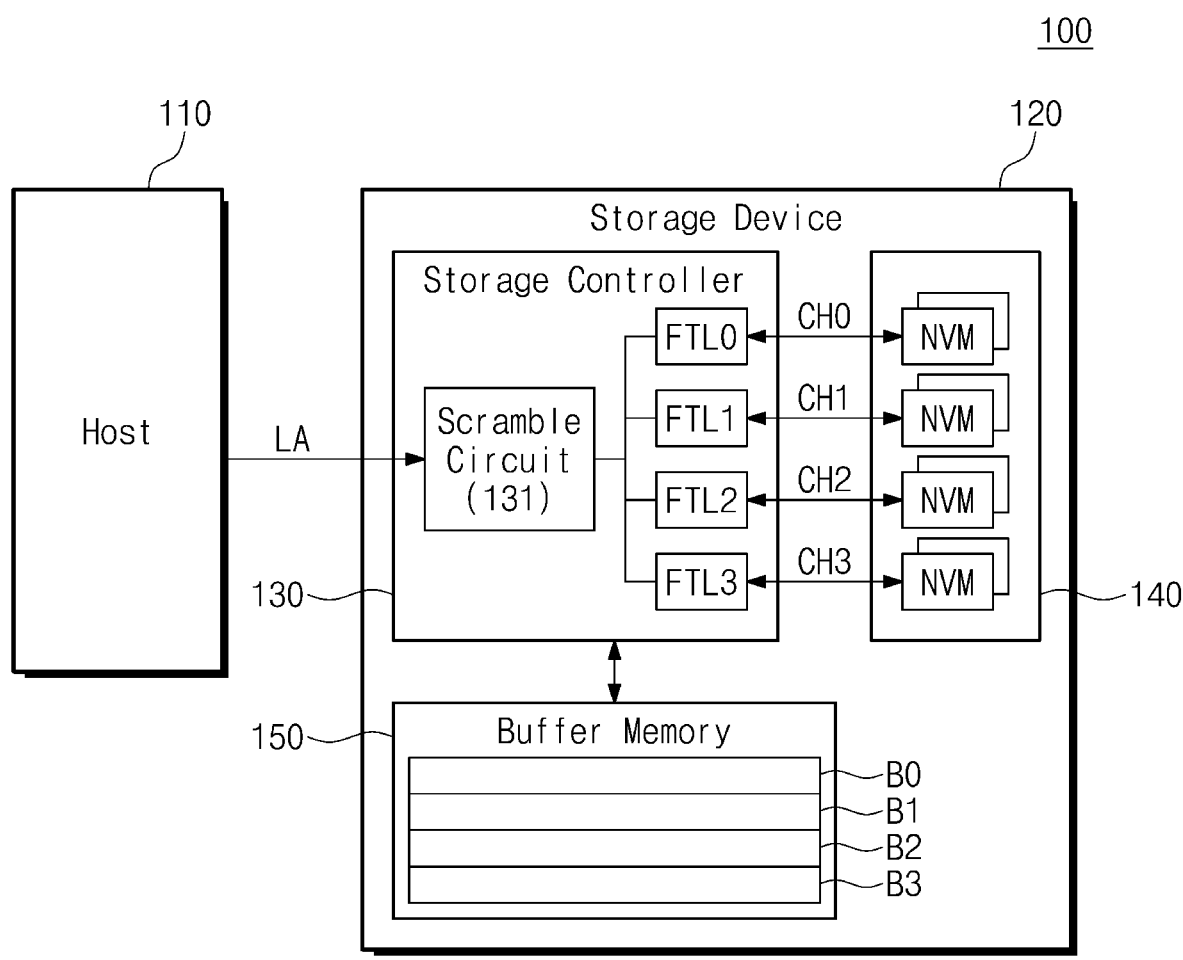
FIG. 1 is a block diagram illustrating a storage system according to an example embodiment of the inventive concept.

FIG. 1 is a block diagram illustrating a storage system according to an example embodiment of the inventive concept. Referring to FIG. 1, a storage system 100 may include a host 110 and a storage device 120. The host 110 may communicate with the storage device 120 through an interface. For example, the host 110 may store data in the storage device 120 or may read data stored in the storage device 120 through the interface.

The storage device 120 may include a storage controller 130, a nonvolatile memory device 140, and a buffer memory 150. The storage controller 130 may be configured to process various requests from the host 110. For example, depending on a request (e.g., a write or read request) of the host 110, the storage controller 130 may store data in the nonvolatile memory device 140 or may read data stored therein.

The storage controller 130 may communicate with the nonvolatile memory device 140 through a plurality of channels CH0, CH1, CH2 and CH3. In an example embodiment of the inventive concept, four channels CH0 to CH3 are illustrated in FIG. 1. However, the inventive concept is not limited thereto. For example, the number of channels may increase or decrease.

Under control of the storage controller 130, the nonvolatile memory device 140 may store data or may output the stored data. The nonvolatile memory device 140 may include a plurality of nonvolatile memories NVM. In an example embodiment of the inventive concept, each of the nonvolatile memories NVM may include a NAND flash memory. However, the inventive concept is not limited thereto. For example, each of the plurality of nonvolatile memory NVM may include at least one of various memory devices such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

Under control of the storage controller 130, the buffer memory 150 may store data or may output the stored data. In an example embodiment of the inventive concept, the buffer memory 150 may include a DRAM. However, the inventive concept is not limited thereto. The buffer memory 150 may store data before the data are stored in the nonvolatile memory device 140. For example, data fetched from the host 110 may be first stored in the buffer memory 150. Afterwards, a physical address of the nonvolatile memory device 140 may be allocated to the data stored in the buffer memory 150, and the data may then be stored in a space indicated by the physical address.

The buffer memory 150 may include 0-th to third buffer spaces B0 to B3. The 0-th buffer space B0 may be managed by a 0-th flash translation layer FTL0. The first buffer space B1 may be managed by a first flash translation layer FTL1. The second buffer space B2 may be managed by a second flash translation layer FTL2. The third buffer space B3 may be managed by a third flash translation layer FTL3.

In an example embodiment of the inventive concept, the storage controller 130 may include a scramble circuit 131 and the plurality of flash translation layers FTL0 to FTL3. The plurality of flash translation layers FTL0 to FTL3 may control the nonvolatile memory device 140 through the corresponding channels CH0 to CH3, respectively. For example, the 0-th flash translation layer FTL0 may manage or control the plurality of nonvolatile memories NVM connected with the 0-th channel CH0 through the 0-th channel CH0. In an example embodiment of the inventive concept, the 0-th flash translation layer FTL0 may perform various maintenance operations, which are associated with the plurality of nonvolatile memories NVM connected with the 0-th channel CH0, such as mapping table management, bad block management, and wear leveling. The first flash translation layer FTL1 may manage or control the plurality of nonvolatile memories NVM connected with the first channel CH1 through the first channel CH1. The second flash translation layer FTL2 may manage or control the plurality of nonvolatile memories NVM connected with the second channel CH2 through the second channel CH2. The third flash translation layer FTL3 may manage or control the plurality of nonvolatile memories NVM connected with the third channel CH3 through the third channel CH3.

The scramble circuit 131 may receive write requests each including a logical address LA from the host 110 and may allocate the write requests to the plurality of flash translation layers FTL0 to FTL3. For example, the logical address LA may indicate a logical block address LBA managed by the host 110, and the host 110 may recognize or manage a storage space of the storage device 120 based on the logical block address LBA. In an example embodiment of the inventive concept, the logical block address LBA may be used for a file system of the host 110 to write or read data in the storage space of the storage device 120 in units of a data block. In an example embodiment of the inventive concept, the scramble circuit 131 may allocate the write requests to the plurality of flash translation layers FTL0 to FTL3 based on the logical address LA.

In an example embodiment of the inventive concept, under various operation conditions or various operation environments, the performance of the storage device 120 may not be uniformly maintained. The performance of the storage device 120 may refer to the amount of data exchanged between the storage device 120 and the host 110 per unit time or a data transfer speed. For example, a time when an operation corresponding to the same write request is completed may vary depending on a physical characteristic or various environment variables (e.g., the size of a buffer memory and an available memory capacity in a nonvolatile memory device) of the nonvolatile memory device 140. In particular, in the case of receiving data of a specific pattern, data may be focused on a specific channel of the plurality of channels CH0 to CH3. For example, one of the channels CH0 to CH3 may be overloaded during this operation. This may cause performance fluctuations of the storage device 120. In other words, in the storage device 120, even though parallel processing may be maximized, write requests may not be uniformly allocated to a plurality of resources, thereby causing a reduction in its performance.

The storage device 120 may perform a scramble operation on the logical address LA such that the storage device 120 provides uniform performance or maximum performance. The scramble operation may be an operation of scrambling logical addresses LA received from the host 110 to generate scrambled logical addresses, such that requests are respectively allocated to the plurality of flash translation layers FTL0 to FTL3 based on the scrambled logical addresses. In other words, the requests may not be overly skewed towards a specific one of the flash translation layers FTL0 to FTL3. In an example embodiment of the inventive concept, through the scramble operation, an allocation sequence of the plurality of flash translation layers FTL0 to FTL3 may vary depending on a logical address section. In this case, requests may be uniformly allocated to the plurality of flash translation layers FTL0 to FTL3, and the sequentiality of data may be maintained. Accordingly, the performance of the storage device 120 may be increased. A configuration and an operation of the scramble circuit 131 will be more fully described with reference to the following drawings.

Figure 2:
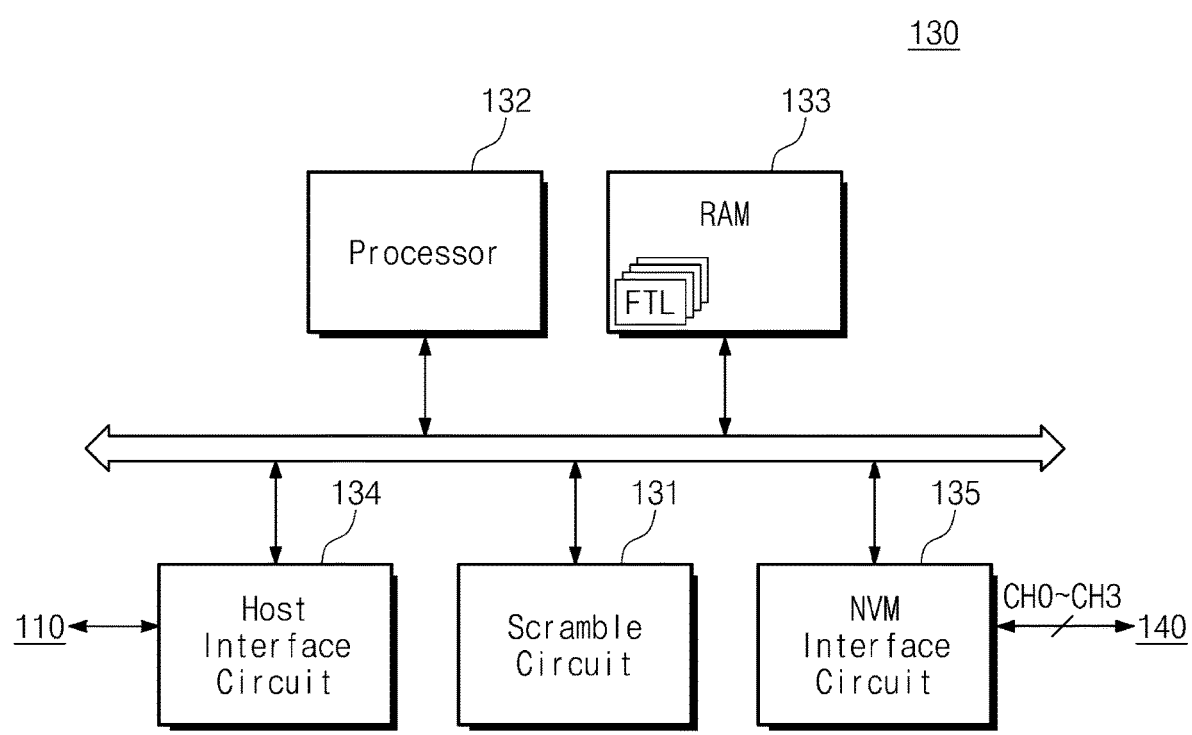
FIG. 2 is a block diagram illustrating a storage controller of FIG. 1.

FIG. 2 is a block diagram illustrating a storage controller of FIG. 1. Referring to FIGS. 1 and 2, the storage controller 130 may include the scramble circuit 131, a processor 132, a RAM 133, a host interface circuit 134, and a nonvolatile memory interface circuit 135.

The scramble circuit 131 may scramble a logical address included in a write request received from the host interface circuit 134. The scramble circuit 131 may generate a scrambled logical address. The scramble circuit 131 may allocate write/read requests to the plurality of flash translation layers FTL0 to FTL3 based on scrambled logical addresses. A configuration and an operation of the scramble circuit 131 will be more fully described with reference to the following drawings.

The processor 132 may control overall operations of the storage controller 130. Alternatively, the processor 132 may be configured to perform various operations necessary for the storage controller 130 to operate.

The RAM 133 may be configured to store a variety of information necessary for the storage controller 130 to operate. The RAM 133 may be a buffer memory, a cache memory, or a working memory of the storage controller 130. In an example embodiment of the inventive concept, the RAM 133 may store the plurality of flash translation layers FTL0 to FTL3. The plurality of flash translation layers FTL0 to FTL3 stored in the RAM 133 may be driven by the processor 132.

The host interface circuit 134 may communicate with the host 110 in accordance with a communication protocol. The host interface circuit 134 may be implemented based on the communication protocol. In an example embodiment of the inventive concept, the interface protocol may include at least one of various interfaces such as a SATA (Serial ATA) interface, a PCIe (Peripheral Component Interconnect Express) interface, a SAS (Serial Attached SCSI) interface, an NVMe (Nonvolatile Memory express) interface, and an UFS (Universal Flash Storage) interface.

The nonvolatile memory interface circuit 135 may communicate with the nonvolatile memory device 140 in accordance with a communication protocol. In an example embodiment of the inventive concept, the nonvolatile memory interface circuit 135 may provide the plurality of channels CH0 to CH3 that are physically separated from each other. In an example embodiment of the inventive concept, the interface protocol may be a NAND interface.

Figure 3A:
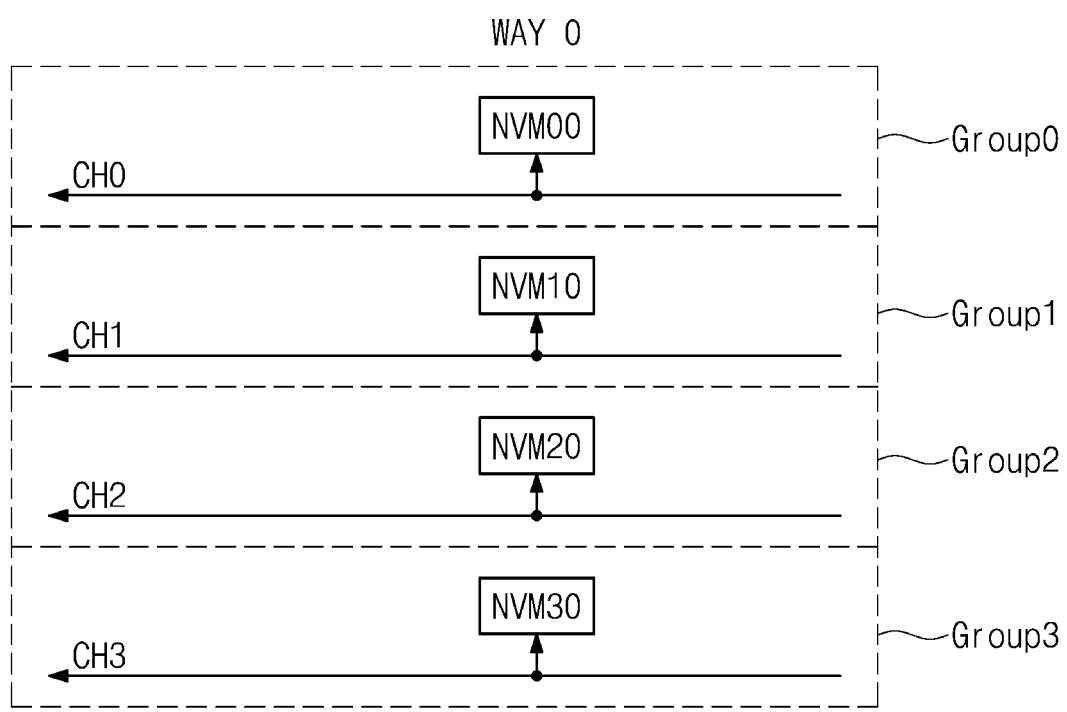
FIGS. 3A, 3B and 3C are block diagrams illustrating various topologies of nonvolatile memory devices according to an example embodiment of the inventive concept.
Figure 3B:
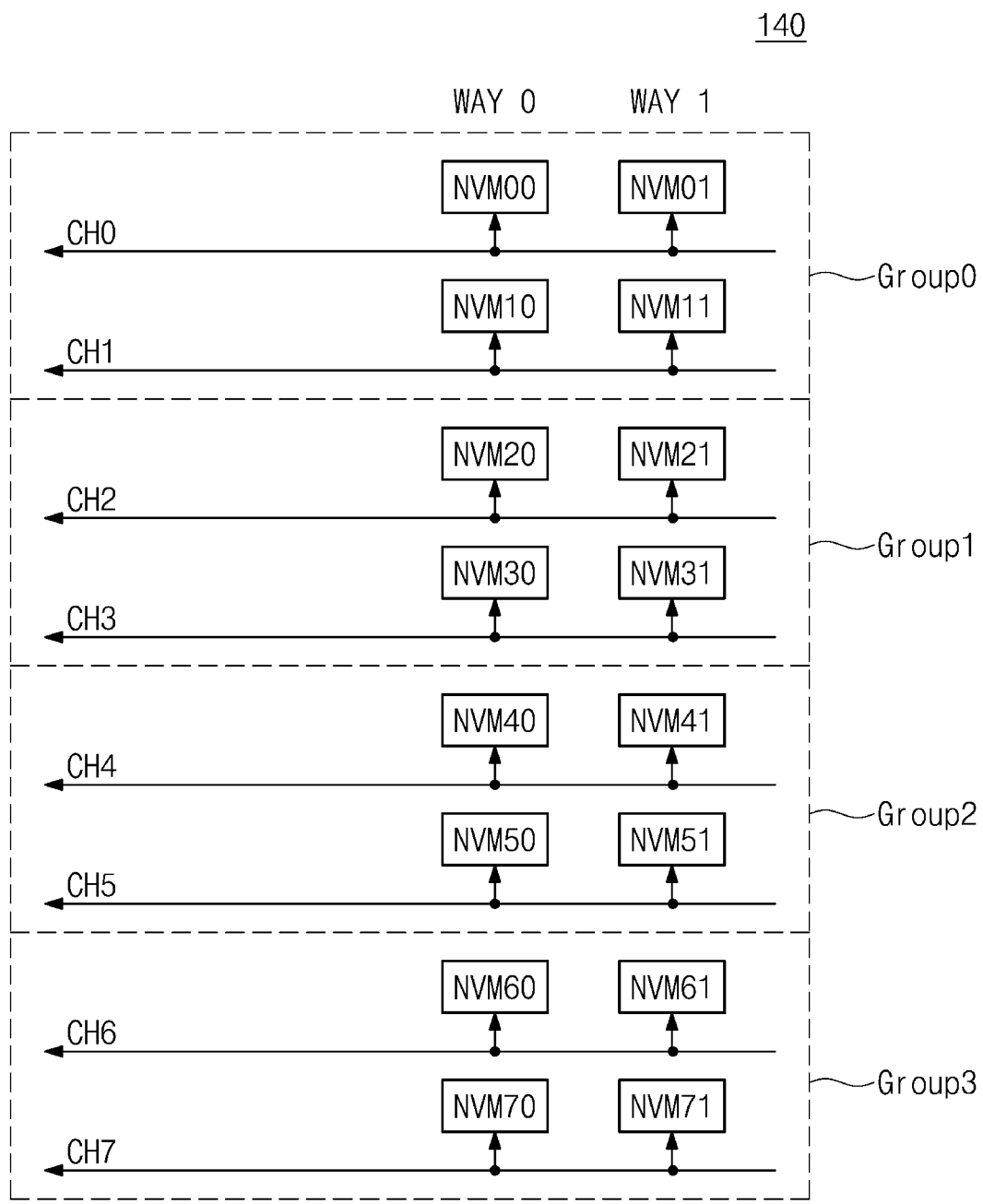
Figure 3C:
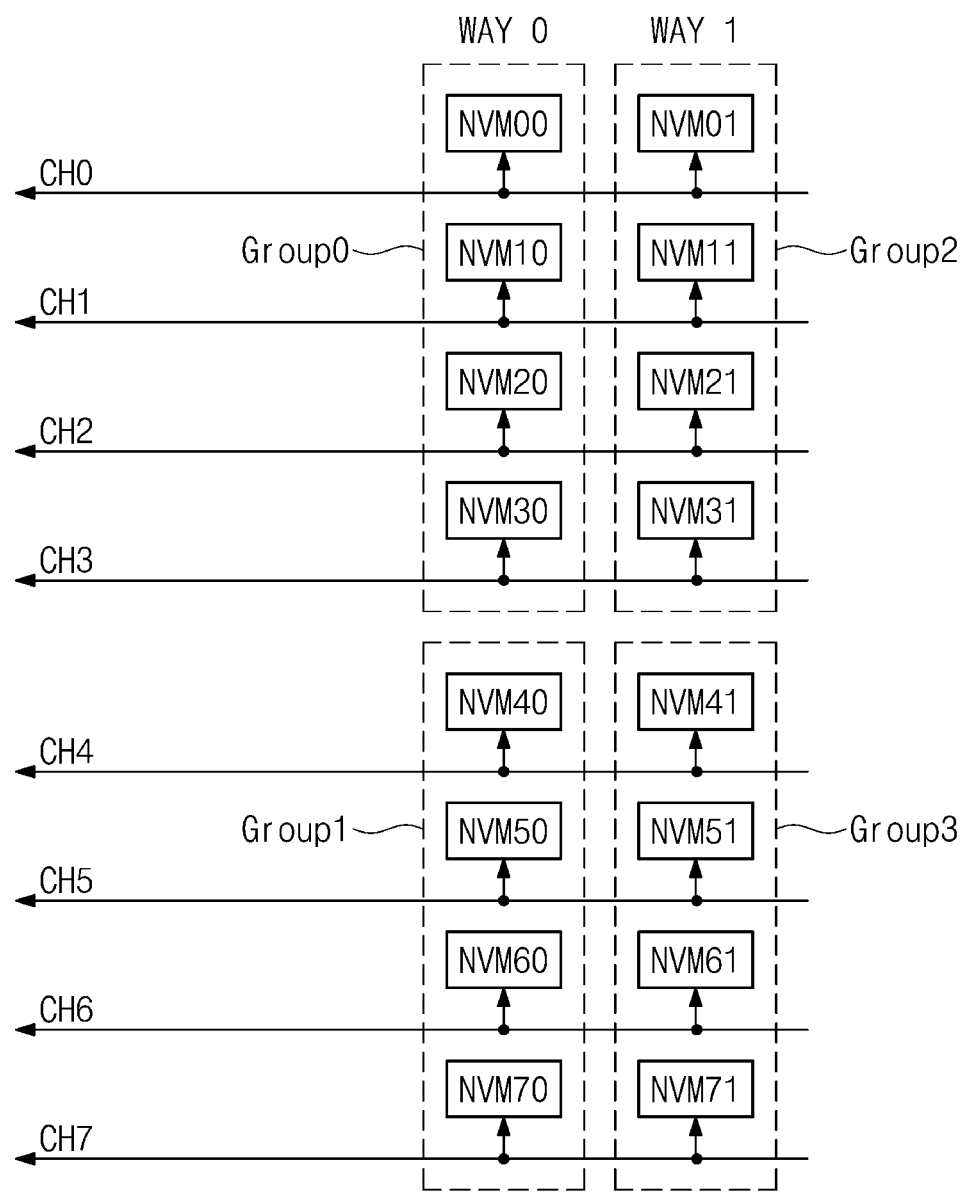

FIGS. 3A to 3C are block diagrams illustrating various topologies of nonvolatile memory devices according to example embodiments of the inventive concept. In an example embodiment of the inventive concept, various topologies in which the storage controller 130 is capable of recognizing a plurality of memory groups will be described with reference to FIGS. 3A to 3C.

Referring to FIGS. 1 and 3A, the nonvolatile memory device 140 may include a plurality of nonvolatile memories NVM00, NVM10, NVM20, and NVM30. Each of the plurality of nonvolatile memories NVM00, NVM10, NVM20, and NVM30 may be implemented with one semiconductor chip, one semiconductor die, or one semiconductor package.

The plurality of nonvolatile memories NVM00, NVM10, NVM20, and NVM30 may be implemented in a 4-channel 1-way structure. For example, the nonvolatile memory NVM00 may be connected with the 0-th channel CH0, the nonvolatile memory NVM10 may be connected with the first channel CH1, the nonvolatile memory NVM20 may be connected with the second channel CH2, and the nonvolatile memory NVM30 may be connected with the third channel CH3. In other words, each of the nonvolatile memories NVM00, NVM00, NVM20, and NVM30 may be connected to its own channel. The plurality of nonvolatile memories NVM00, NVM10, NVM20, and NVM30 may constitute a 0-th way WAY0.

In an example embodiment of the inventive concept, the plurality of nonvolatile memories NVM00, NVM10, NVM20, and NVM30 may be divided into a plurality of groups Group0 to Group3. The 0-th memory group Group0 may include the nonvolatile memory NVM00 connected with the 0-th channel CH0, the first memory group Group1 may include the nonvolatile memory NVM10 connected with the first channel CH1, the second memory group Group2 may include the nonvolatile memory NVM20 connected with the second channel CH2, and the third memory group Group3 may include the nonvolatile memory NVM30 connected with the third channel CH3.

The plurality of groups Group0 to Group3 may be respectively managed or controlled by the corresponding flash translation layers FTL0 to FTL3. For example, the 0-th memory group Group0 may be managed by the 0-th flash translation layer FTL0, the first memory group Group1 may be managed by the first flash translation layer FTL1, the second memory group Group2 may be managed by the second flash translation layer FTL2, and the third memory group Group3 may be managed by the third flash translation layer FTL3.

Referring to FIGS. 1 and 3B, the nonvolatile memory device 140 may include a plurality of nonvolatile memories NVM00 to NVM71. The plurality of nonvolatile memories NVM00 to NVM71 of FIG. 3B may be implemented in a 8-channel 2-way structure.

For example, a first part NVM00 and NVM01 of the plurality of nonvolatile memories NVM00 to NVM71 may communicate with the storage controller 130 through the 0-th channel CH0, a second part NVM10 and NVM11 of the nonvolatile memories NVM00 to NVM71 may communicate with the storage controller 130 through the first channel CH1, a third part NVM20 and NVM21 of the nonvolatile memories NVM00 to NVM71 may communicate with the storage controller 130 through the second channel CH2, a fourth part NVM30 and NVM31 of the nonvolatile memories NVM00 to NVM71 may communicate with the storage controller 130 through the third channel CH3, a fifth part NVM40 and NVM41 of the nonvolatile memories NVM00 to NVM71 may communicate with the storage controller 130 through the fourth channel CH4, a sixth part NVM50 and NVM51 of the nonvolatile memories NVM00 to NVM71 may communicate with the storage controller 130 through the fifth channel CH5, a seventh part NVM60 and NVM61 of the nonvolatile memories NVM00 to NVM71 may communicate with the storage controller 130 through the sixth channel CH6, and an eighth part NVM70 and NVM71 of the nonvolatile memories NVM00 to NVM71 may communicate with the storage controller 130 through the seventh channel CH7.

The plurality of nonvolatile memories NVM00 to NVM71 may constitute a plurality of ways WAY0 and WAY1. For example, the 0-th way WAY0 may include the nonvolatile memories NVM00, NVM10, NVM20, NVM30, NVM40, NVM50, NVM60, and NVM70 corresponding to a first part, and the first way WAY1 may include the nonvolatile memories NVM01, NVM11, NVM21, NVM31, NVM41, NVM51, NVM61, and NVM71 corresponding to a second part. In other words, the nonvolatile memory device 140 may have a multi-way multi-channel structure, but the inventive concept is not limited thereto.

The plurality of nonvolatile memories NVM00 to NVM71 may be divided into a plurality of groups Group0 to Group3. The 0-th memory group Group0 may include the nonvolatile memories NVM00, NVM01, NVM10, and NVM11 connected with the 0-th and first channels CH0 and CH1 from among the plurality of nonvolatile memories NVM00 to NVM71, the first memory group Group1 may include the nonvolatile memories NVM20, NVM21, NVM30, and NVM31 connected with the second and third channels CH2 and CH3 from among the plurality of nonvolatile memories NVM00 to NVM71, the second memory group Group2 may include the nonvolatile memories NVM40, NVM41, NVM50, and NVM51 connected with the fourth and fifth channels CH4 and CH5 from among the plurality of nonvolatile memories NVM00 to NVM71, and the third memory group Group3 may include the nonvolatile memories NVM60, NVM61, NVM70, and NVM71 connected with the sixth and seventh channels CH6 and CH7 from among the plurality of nonvolatile memories NVM00 to NVM71.

The plurality of groups Group0 to Group3 may be respectively managed or controlled by the corresponding flash translation layers FTL0 to FTL3. For example, first group Group1 may be controlled by the first flash translation layer FTL1. This is described with reference to FIG. 3A, and thus, additional description will be omitted to avoid redundancy.

Referring to FIGS. 1 and 3C, the nonvolatile memory device 140 may include the plurality of nonvolatile memories NVM00 to NVM71. The plurality of nonvolatile memories NVM00 to NVM71 of FIG. 3C may have a structure (e.g., a 8-channel 2-way structure) similar to that of the plurality of nonvolatile memories NVM00 to NVM71 of FIG. 3B.

The plurality of nonvolatile memories NVM00 to NVM71 may be divided into a plurality of groups Group0 to Group3. The 0-th memory group Group0 may include the nonvolatile memories NVM00, NVM10, NVM20, and NVM30 corresponding to the 0-th way WAY0 from among the plurality of nonvolatile memories NVM00 to NVM71, the first memory group Group1 may include the nonvolatile memories NVM40, NVM50, NVM60, and NVM70 corresponding to the 0-th way WAY0 from among the plurality the nonvolatile memories NVM00 to NVM71, and the second memory group Group2 may include the nonvolatile memories NVM01, NVM11, NVM21, and NVM31 corresponding to the first way WAY1 from among the plurality of nonvolatile memories NVM00 to NVM71. The third memory group Group3 may include the nonvolatile memories NVM41, NVM51, NVM61, and NVM71 corresponding to the first way WAY1 from among the plurality of nonvolatile memories NVM00 to NVM71.

As described above, the storage controller 130 may logically or physically divide and recognize the storage area of the nonvolatile memory device 140 into the plurality of memory groups Group0 to Group3. The storage controller 130 may control the logically or physically divided memory groups Group0 to Group3 independently of each other.

In an example embodiment of the inventive concept, various topologies of the storage device 120 that is capable of recognizing a plurality of memory groups are described with reference to FIGS. 3A to 3C. However, for convenience of description, below, the description will be mainly given with reference to FIG. 3A.

Figure 4:
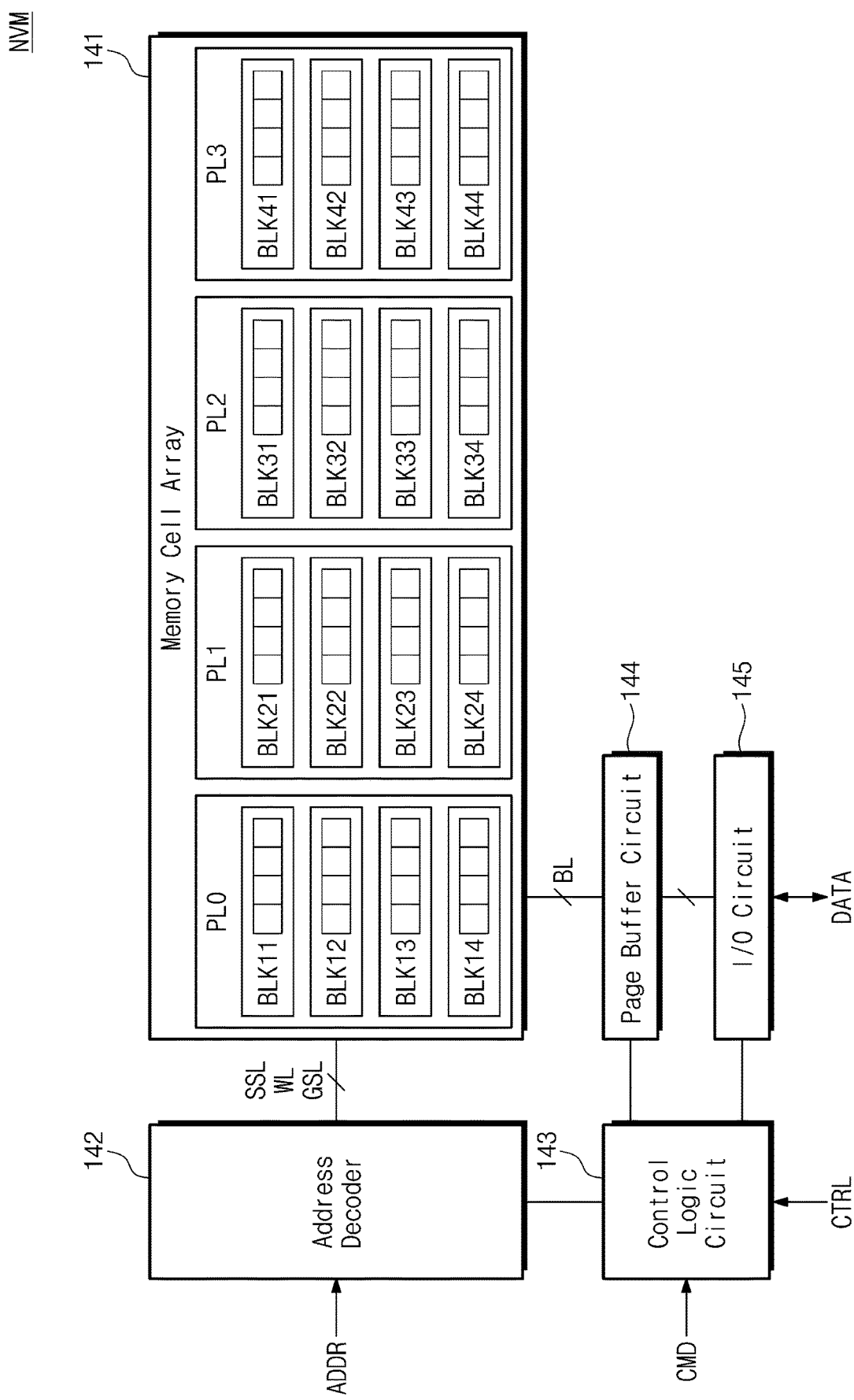
FIG. 4 is a block diagram illustrating a nonvolatile memory of FIG. 1.

FIG. 4 is a block diagram illustrating a nonvolatile memory of FIG. 1. Referring to FIGS. 1 and 4, a nonvolatile memory NVM may include a memory cell array 141, an address decoder 142, a control logic circuit 143, a page buffer circuit 144, and an input/output circuit 145.

The memory cell array 141 may include a plurality of planes PL0 to PL3. Each of the plurality of planes PL0 to PL3 may include a plurality of memory blocks. For example, the first plane PL0 may include a plurality of memory blocks BLK11 to BLK14, the second plane PL1 may include a plurality of memory blocks BLK21 to BLK24, the third plane PL2 may include a plurality of memory blocks BLK31 to BLK34, and the fourth plane PL3 may include a plurality of memory blocks BLK41 to BLK44. In an example embodiment of the inventive concept, a plurality of memory blocks (e.g., BLK11 to BLK14) included in the same plane (e.g., PL0) may be configured to share the same bit lines, but the inventive concept is not limited thereto.

Each of the plurality of memory blocks BLK11 to BLK14, BLK21 to BLK24, BLK31 to BLK34, and BLK41 to BLK44 may be configured to store a plurality of pages. For example, each of the plurality of memory blocks BLK11 to BLK14, BLK21 to BLK24, BLK31 to BLK34, and BLK41 to BLK44 may include a plurality of memory cells, which are connected with a plurality of word lines. Memory cells connected with one word line may be configured to store at least one page. The number of pages stored in memory cells connected with one word line may vary depending on a way to program memory cells (e.g., a single level cell (SLC), a multi-level cell (MLC), a triple level cell (TLC), or quad-level cell (QLC) programming technique).

For brevity of drawing, an example is illustrated as one nonvolatile memory NVM includes the 0-th to third planes PL0 to PL3 and each of the planes PL0 to PL3 includes the plurality of memory blocks BLK11 to BLK14, BLK21 to BLK24, BLK31 to BLK34, and BLK41 to BLK44, but the inventive concept is not limited thereto. For example, the number of planes, the number of memory blocks, or the number of bits stored per memory cell may be variously changed or modified.

The address decoder 142 may be connected with the memory cell array 141 through string selection lines SSL, word lines WL, and ground selection lines GSL. The address decoder 142 may receive an address ADDR from the storage controller 130, may decode the received address ADDR, and may control voltages of the word lines WL, based on the decoded address.

The control logic circuit 143 may receive a command CMD and a control signal CTRL from the storage controller 130 and may control the address decoder 142, the page buffer circuit 144, and the input/output circuit 145 based on the received signals.

The page buffer circuit 144 is connected with the memory cell array 141 through bit lines BL. The page buffer circuit 144 may temporarily store data read from the memory cell array 141 or data to be stored in the memory cell array 141.

The input/output circuit 145 may provide data "DATA" received from the storage controller 130 to the page buffer circuit 144 or may send the data "DATA" received from the page buffer circuit 144 to the storage controller 130.

In an example embodiment of the inventive concept, various signals (e.g., the address ADDR, the command CMD, the control signal CTRL, and the data "DATA") between the storage controller 130 and the plurality of nonvolatile memories may be exchanged through a channel of the plurality of channels CH0 to CH3.

Figure 5A:
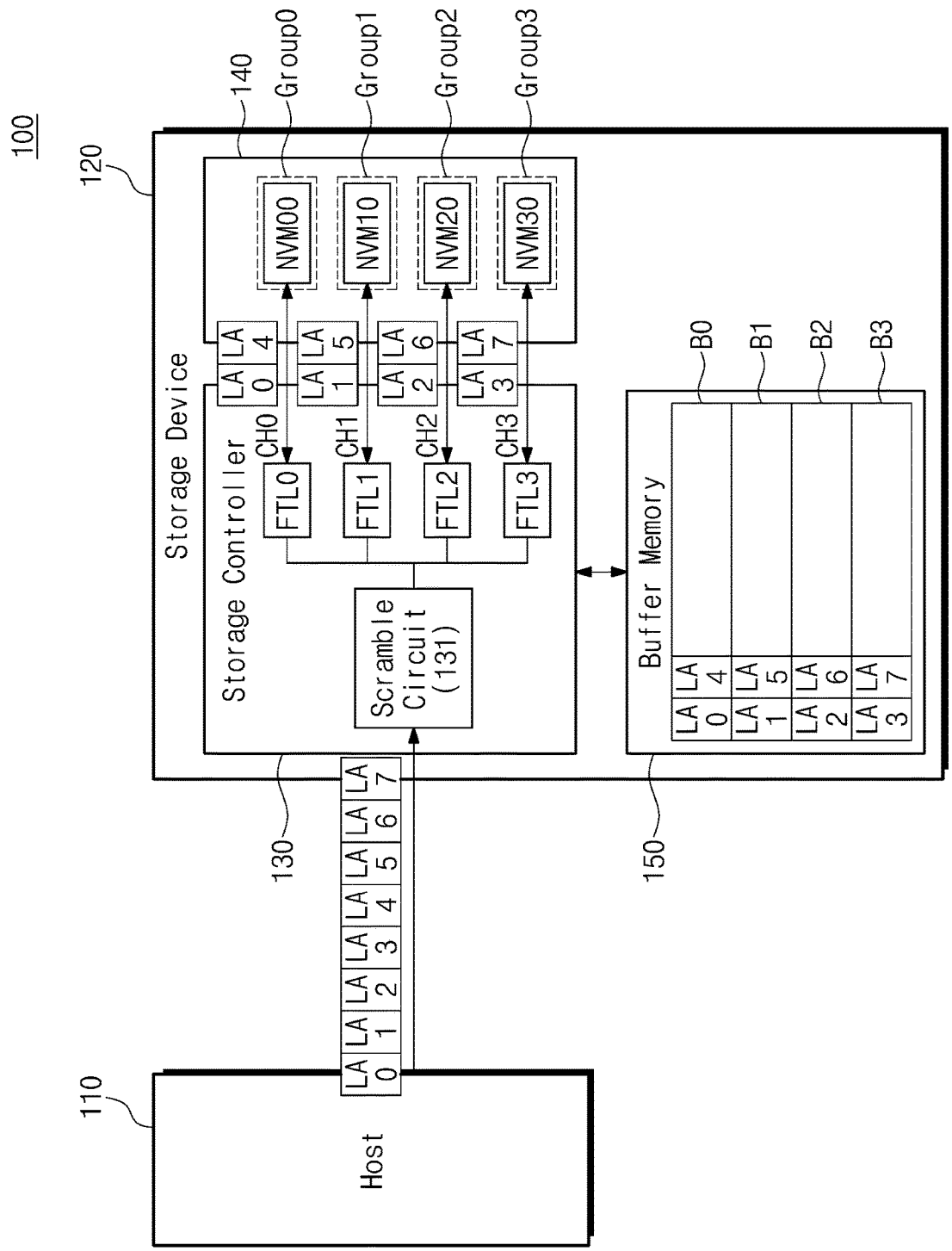
FIGS. 5A, 5B and 5C are diagrams for describing an operation of a scramble circuit of FIG. 1.
Figure 5B:
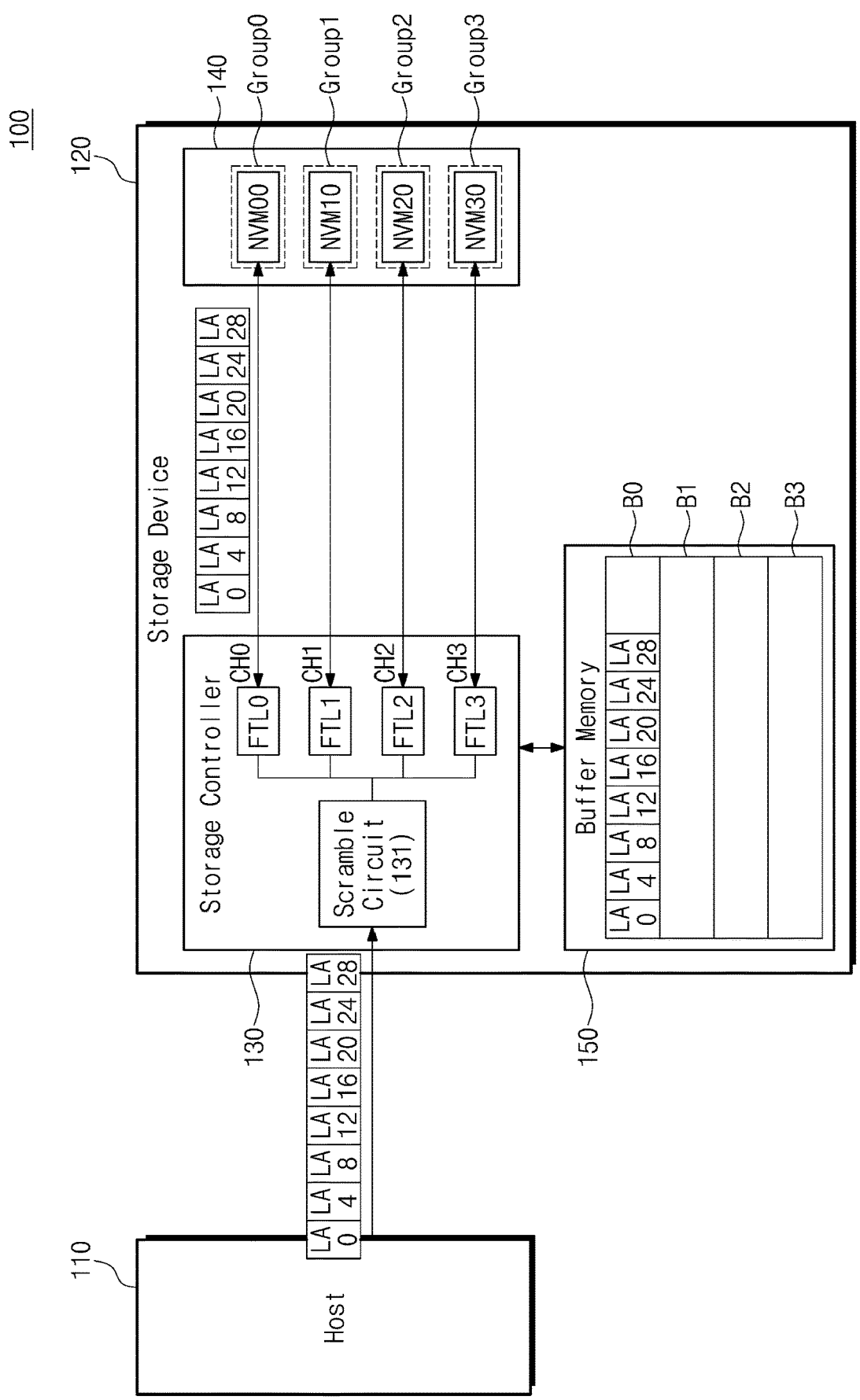
Figure 5C:
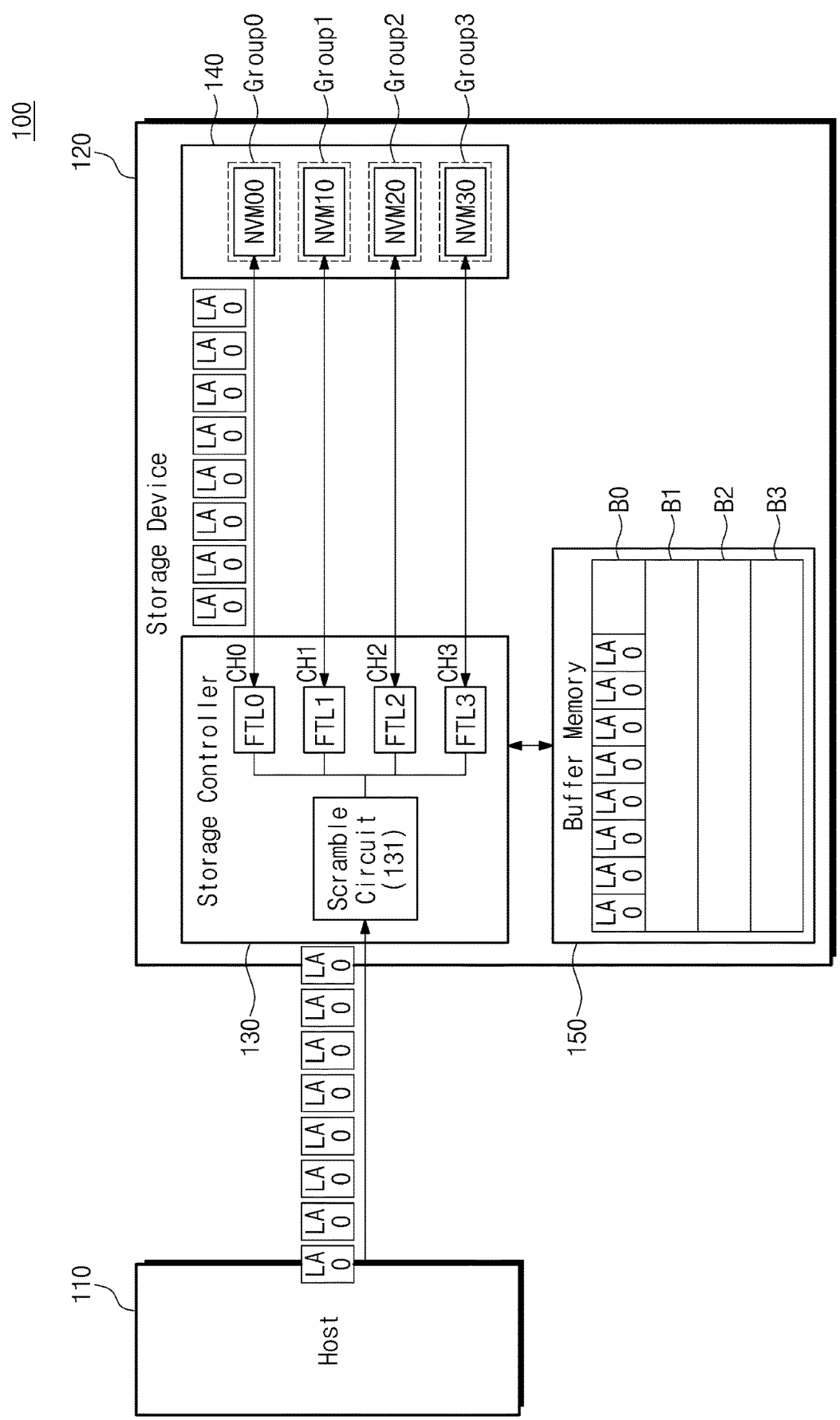

FIGS. 5A to 5C are diagrams for describing an operation of a scramble circuit of FIG. 1. In an example embodiment of the inventive concept, an example of receiving write requests for sequential logical addresses will be described with reference to FIG. 5A, an example of receiving write requests for logical addresses of a specific pattern will be described with reference to FIG. 5B, and an example of repeatedly receiving a write request for a specific logical address will be described with reference to FIG. 5C.

Referring to FIG. 5A, the storage system 100 may include the host 110 and the storage device 120. The storage device 120 may include the storage controller 130, the nonvolatile memory device 140, and the buffer memory 150. The storage controller 130 may communicate with the nonvolatile memory device 140 through the plurality of channels CH0 to CH3. The storage controller 130 may include the scramble circuit 131 and the 0-th to third flash translation layers FTL0 to FTL3.

Below, for brevity of drawing and convenience of description, it is assumed that the nonvolatile memory device 140 is implemented according to the topology described with reference to FIG. 3A. In other words, the nonvolatile memory device 140 may include the plurality of nonvolatile memories NVM00, NVM10, NVM20, and NVM30. In this case, the nonvolatile memory NVM00 connected with the 0-th channel CH0 may be included in the 0-th group Group0; the nonvolatile memory NVM10 connected with the first channel CH1 may be included in the first group Group1; the nonvolatile memory NVM20 connected with the second channel CH2 may be included in the second group Group2; and, the nonvolatile memory NVM30 connected with the third channel CH3 may be included in the third group Group3.

The 0-th memory group Group0 may be managed by the 0-th flash translation layer FTL0, the first memory group Group1 may be managed by the first flash translation layer FTL1, the second memory group Group2 may be managed by the second flash translation layer FTL2, and the third memory group Group3 may be managed by the third flash translation layer FTL3. However, the inventive concept is not limited thereto. An operation of the scramble circuit 131 will be described with reference to the nonvolatile memory device 140 having the structure of FIG. 3A but may be applied to a nonvolatile memory device having the structure of FIG. 3B, the structure of FIG. 3C, or any other structure(s).

In addition, below, for convenience of description, the operation of the scramble circuit 131 will be described with reference to a write request. However, the inventive concept is not limited thereto. For example, the operation of the scramble circuit 131 may be applied to any other operations including a read operation. In the following drawings, for brevity of the drawings, only the logical address LA is illustrated but may indicate a write request (or a write command) including a relevant logical address or page data corresponding to the relevant logical address.

The buffer memory 150 may include the 0-th to third buffer spaces B0 to B3. The buffer memory 150 is described with reference to FIG. 1, and thus, additional description will be omitted to avoid redundancy.

The host 110 may send write requests (e.g., write commands) for data corresponding to 0-th to seventh logical addresses LA0 to LA7 to the storage device 120. Alternatively, the storage device 120 may fetch a write request (or a write command) and page data stored in a memory of the host 110. Each of the 0-th to seventh logical addresses LA0 to LA7 may include a logical address having a relevant logical address value. In an example embodiment of the inventive concept, the 0-th logical address LA0 may be a logical address in which a logical address value is "0". A logical address value may indicate an address or a location of a storage space, at which data are stored.

The 0-th to seventh logical addresses LA0 to LA7 may form a sequential address or a sequential logical address. The sequential address may be a set of consecutive addresses that are managed by the host 110. Sequential data may be a set of data corresponding to the sequential address. In an example embodiment of the inventive concept, that the 0-th to seventh logical addresses LA0 to LA7 form a sequential address may mean that any other logical address that is managed by the host 110 does not exist between the 0-th to seventh logical addresses LA0 to LA7. In other words, logical address values of the 0-th to seventh logical addresses LA0 to LA7 may have sequentiality.

The scramble circuit 131 may allocate the received write requests to the plurality of flash translation layers FTL0 to FTL3 in a modulo manner. The modulo manner may allocate a write request based on a result value of a modulo operation that is performed on a logical address and the number of flash translation layers FTL0 to FTL3 (e.g., a result value of A mod M: "A" indicating a logical address value and "M" being a modular value corresponding to the number of flash translation layers). For example, the scramble circuit 131 may generate a result value by performing a modulo operation on a logical address based on the number of flash translation layers FTL0 to FTL3. A result value associated with each of the 0-th and fourth logical addresses LA0 and LA4 may be "0", a result value associated with each of the first and fifth logical addresses LA1 and LA5 may be "1", a result value associated with each of the second and sixth logical addresses LA2 and LA6 may be "2", and a result value associated with each of the third and seventh logical addresses LA3 and LA7 may be "3". However, the result values are not limited thereto.

The scramble circuit 131 may allocate write requests corresponding to logical addresses in which a result value of the modulo operation is "0", in other words, the 0-th and fourth logical addresses LA0 and LA4 to the 0-th flash translation layer FTL0, may allocate write requests corresponding to logical addresses in which a result value of the modulo operation is "1", in other words, the first and fifth logical addresses LA1 and LA5 to the first flash translation layer FTL1, may allocate write requests corresponding to logical addresses in which a result value of the modulo operation is "2", in other words, the second and sixth logical addresses LA2 and LA6 to the second flash translation layer FTL2, and may allocate write requests corresponding to logical addresses in which a result value of the modulo operation is "3", in other words, the third and seventh logical addresses LA3 and LA7 to the third flash translation layer FTL3.

Pieces of data received from the host 110 may be first stored in the buffer memory 150. Data that respectively correspond to the 0-th and fourth logical addresses LA0 and LA4 may be stored in the 0-th buffer space B0. Data that respectively correspond to the first and fifth logical addresses LA1 and LA5 may be stored in the first buffer space B1. Data that respectively correspond to the second and sixth logical addresses LA2 and LA6 may be stored in the second buffer space B2. Data that respectively correspond to the third and seventh logical addresses LA3 and LA7 may be stored in the third buffer space B3.

The data stored in the plurality of buffer spaces B0 to B3 may be stored in the nonvolatile memories NVM00, NVM10, NVM20, and NVM30 through the plurality of channels CH0 to CH3 under control of the flash translation layers FTL0 to FTL3. For example, data that respectively corresponds to the 0-th and fourth logical addresses LA0 and LA4 may be stored in the 0-th memory group Group0 through the 0-th channel CH0 under control of the 0-th flash translation layer FTL0. Data that respectively corresponds to the first and fifth logical addresses LA1 and LA5 may be stored in the first memory group Group1 through the first channel CH1 under control of the first flash translation layer FTL1. Data that respectively corresponds to the second and sixth logical addresses LA2 and LA6 may be stored in the second memory group Group2 through the second channel CH2 under control of the second flash translation layer FTL2. Data that respectively corresponds to the third and seventh logical addresses LA3 and LA7 may be stored in the third memory group Group3 through the third channel CH3 under control of the third flash translation layer FTL3.

Referring to FIG. 5B, the configuration of the storage system 100 is described above, and thus, additional description will be omitted to avoid redundancy. The host 110 may send write requests for logical addresses LA0, LA4, LA8, LA12, LA16, LA20, LA24, and LA28 of a specific pattern to the storage device 120. Logical addresses of a specific pattern may indicate a series of logical addresses in which a gap between logical addresses or a difference between logical address values has a uniform value. For example, in the case where a logical address gap is "4", logical addresses of a specific pattern may include a set of logical addresses such as 0-th, fourth, eighth, twelfth, sixteenth, twentieth, twenty-fourth, and twenty-eighth logical addresses LA0, LA4, LA8, LA12, LA16, LA20, LA24, and LA28. In the case where a logical address gap is "2", logical addresses of a specific pattern may include a set of logical addresses such as 0-th, second, fourth, sixth, eighth, tenth, twelfth and fourteenth logical addresses, for example. In an example embodiment of the inventive concept, a value of a logical address gap corresponding to a specific pattern may be determined based on the number of flash translation layers driven by the storage controller 130. For example, if six flash translation layers are driven, the value of the logical address gap may be six.

As described above, the scramble circuit 131 may generate a result value by performing a modulo operation on a received logical address and the number of flash translation layers FT L0 to FTL3 and may allocate a write request to one of the flash translation layers FTL0 to FTL3 based on the generated result value. In the case where the logical addresses LA0, LA4, LA8, LA12, LA16, LA20, LA24, and LA28 have a specific pattern, result values of the modulo operation associated with the logical addresses LA0, LA4, LA8, LA12, LA16, LA20, LA24, and LA28 may be equal (e.g., all the result values may be "0"). In this case, the scramble circuit 131 may allocate all the write requests for the logical addresses LA0, LA4, LA8, LA12, LA16, LA20, LA24, and LA28 to one flash translation layer (e.g., the 0-th flash translation layer FTL0). Accordingly, all data respectively corresponding to the 0-th, fourth, eighth, twelfth, sixteenth, twentieth, twenty-fourth, and twenty-eighth logical addresses LA0, LA4, LA8, LA12, LA16, LA20, LA24, and LA28 may be stored in the 0-th buffer space B0 managed by the 0-th flash translation layer FTL0. Afterwards, the data respectively corresponding to the 0-th, fourth, eighth, twelfth, sixteenth, twentieth, twenty-fourth, and twenty-eighth logical addresses LA0, LA4, LA8, LA12, LA16, LA20, LA24, and LA28 may be stored in the 0-th memory group Group0 through the 0-th channel CH0 under control of the 0-th flash translation layer FTL0.

Referring to FIG. 5C, the configuration of the storage system 100 is described above, and thus, additional description will be omitted to avoid redundancy. The host 110 may repeatedly send write requests for data corresponding to the same logical address to the storage device 120. In other words, the host 110 may repeatedly send a write request for data corresponding to the 0-th logical address LA0 to the storage device 120.

The host 110 may send a command including a forced unit access (FUA) to the storage device 120. The FUA may indicate whether to use a cache of data. In other words, the host 110 may send a write request through the FUA without using a cache of data. Alternatively, the host 110 may send a flush command after sending a write request. In this case, even though a plurality of write requests for the same logical address are received and data associated with the plurality of write requests are not yet stored in the nonvolatile memory device 140, the storage controller 130 may not store only the data associated with the last write request in the nonvolatile memory device 140, but the storage controller 130 may store all the data in the nonvolatile memory device 140.

The storage controller 130 may allocate the received write requests to the plurality of flash translation layers FTL0 to FTL3 in the modulo manner. In other words, the storage controller 130 may allocate all the write requests respectively corresponding to the 0-th logical addresses LA0 received eight times to the 0-th flash translation layer FTL0. Accordingly, all the eight data corresponding to the 0-th logical addresses LA0 may be stored in the 0-th buffer space B0 managed by the 0-th flash translation layer FTL0. The data stored in the 0-th buffer space B0 may be stored in the 0-th memory group Group0 through the 0-th channel CH0 under control of the 0-th flash translation layer FTL0.

Figure 6A:
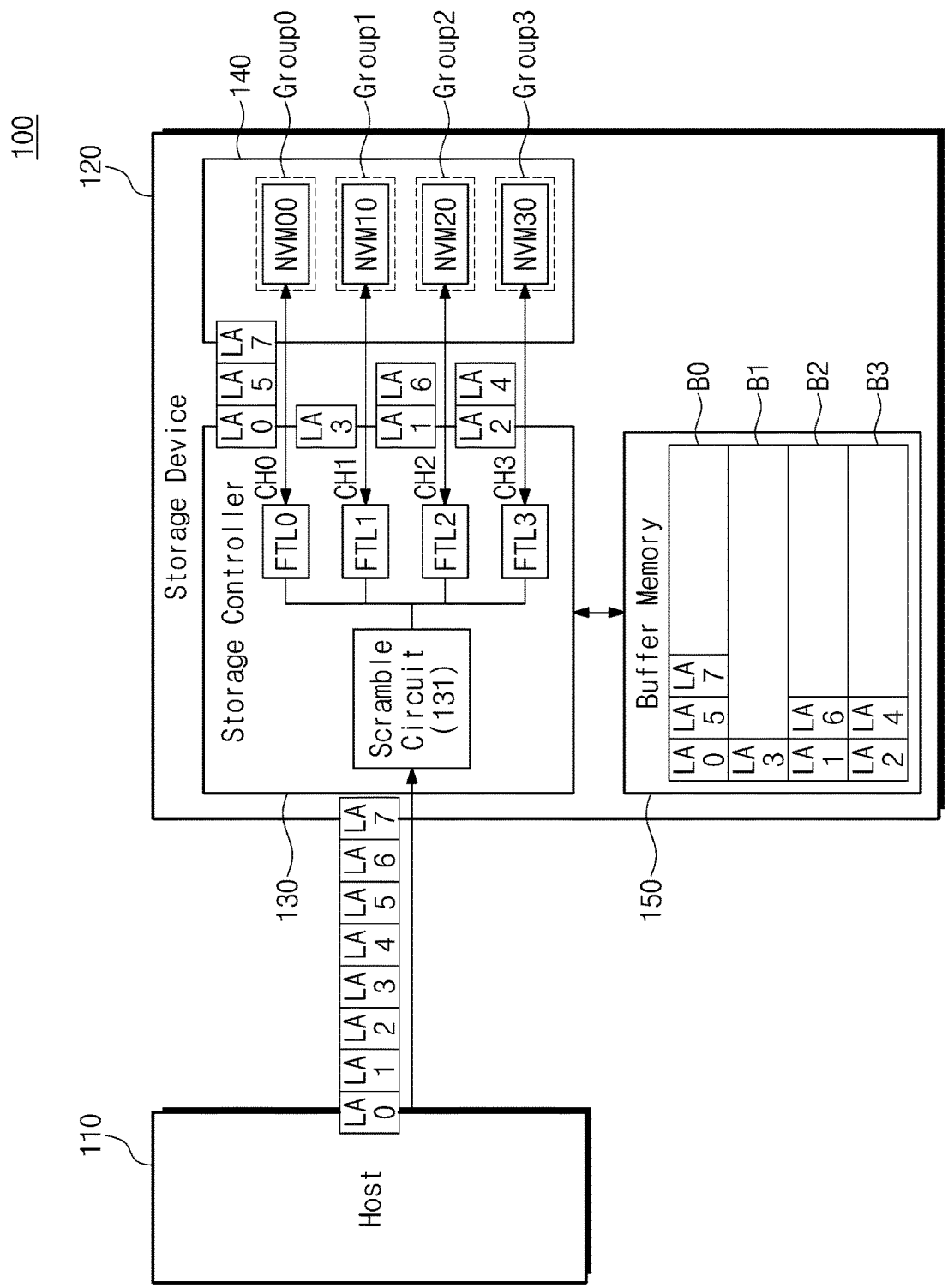
FIGS. 6A, 6B and 6C are diagrams for describing an operation of a scramble circuit of FIG. 1.
Figure 6B:
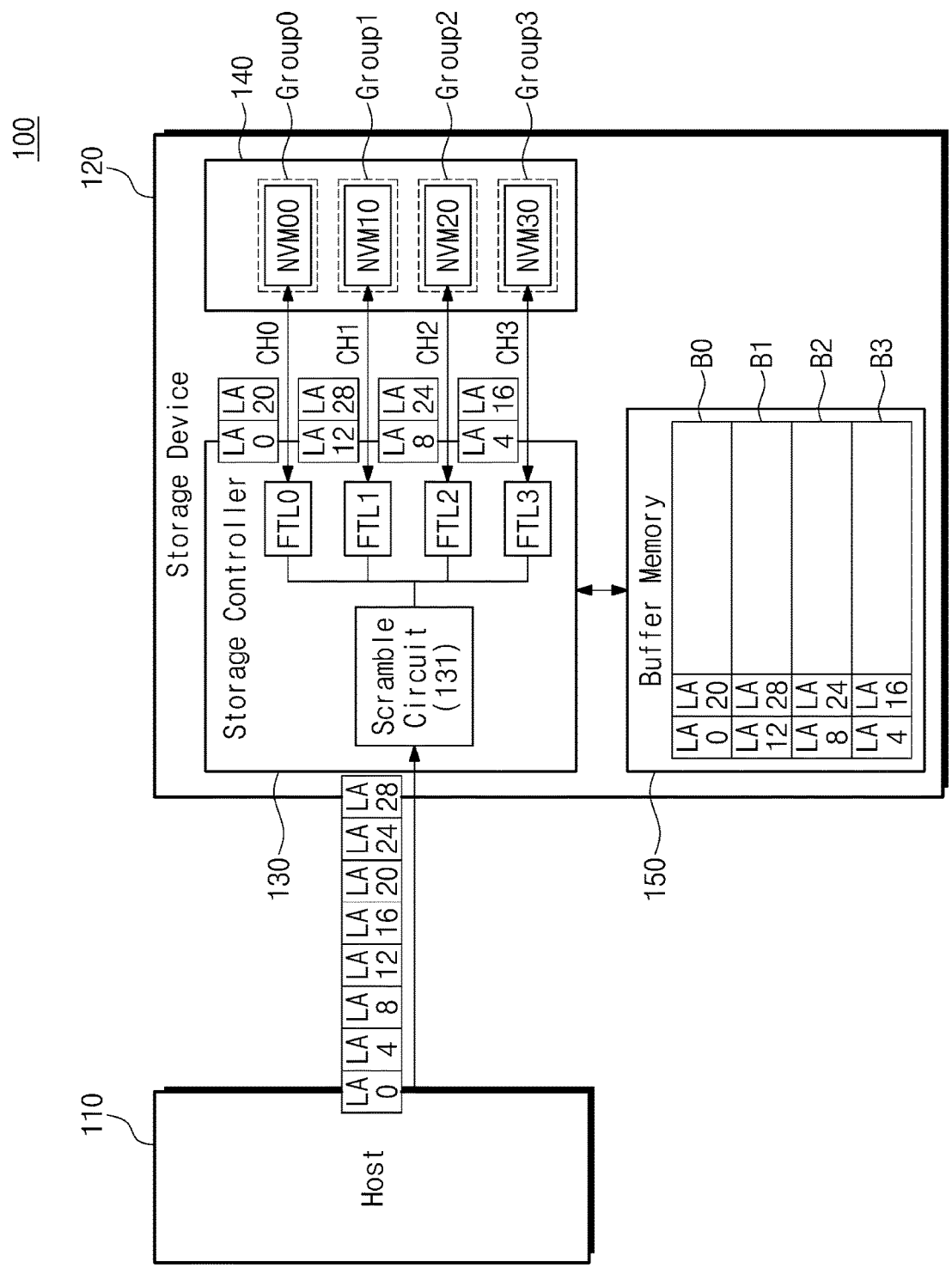
Figure 6C:
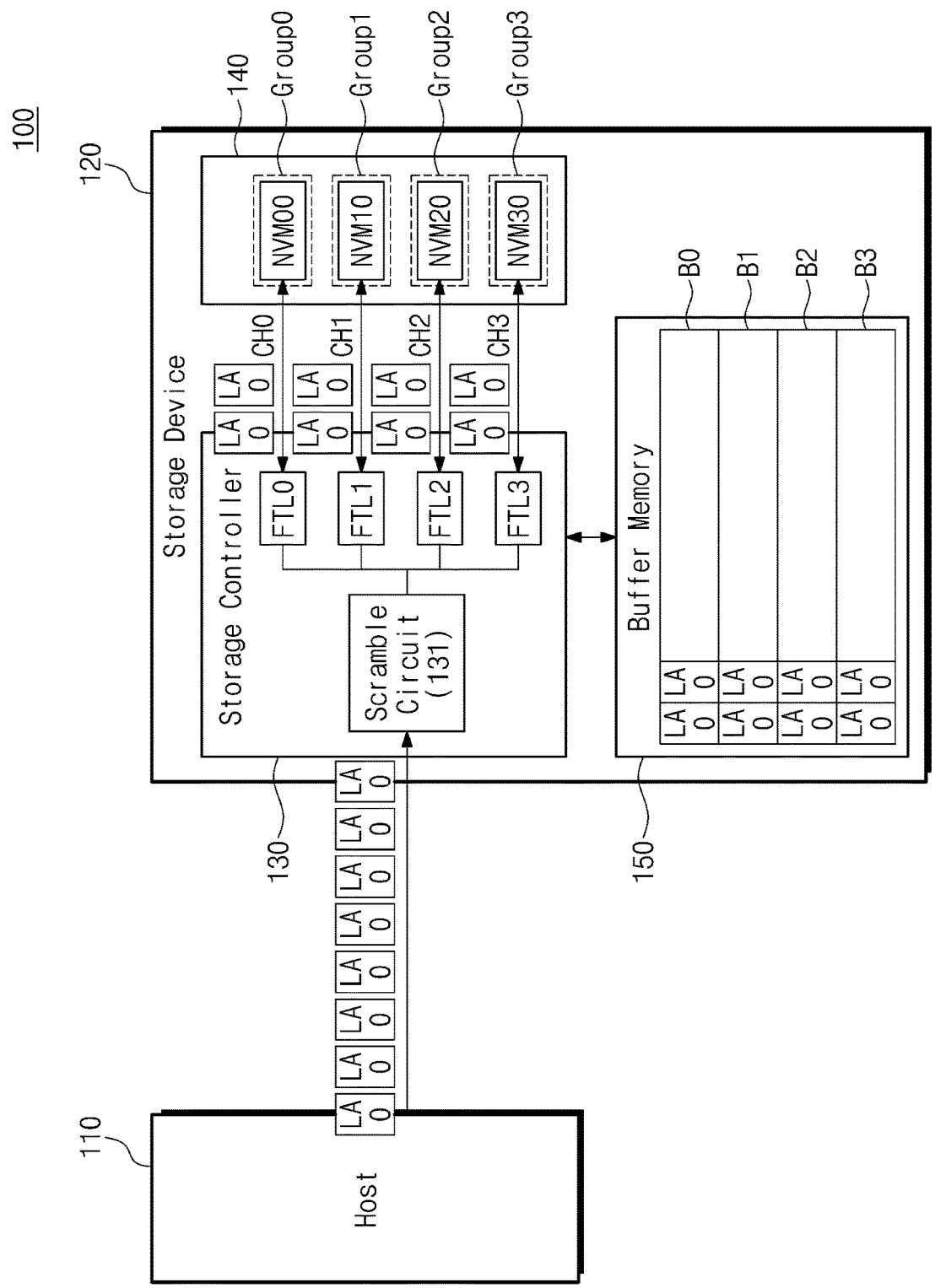

FIGS. 6A to 6C are diagrams for describing an operation of a scramble circuit of FIG. 1. In an example embodiment of the inventive concept, an example of receiving write requests for sequential logical addresses will be described with reference to FIG. 6A, an example of receiving write requests for logical addresses of a specific pattern will be described with reference to FIG. 6B, and an example of repeatedly receiving a write request for a specific logical address will be described with reference to FIG. 6C.

Referring to FIG. 6A, the configuration of the storage system 100 is described above, and thus, additional description will be omitted to avoid redundancy. The host 110 may send write requests (e.g., write commands) for data corresponding to 0-th to seventh logical addresses LA0 to LA7 to the storage device 120. Alternatively, the storage device 120 may fetch a write request (or a write command) and page data stored in a memory of the host 110.

The storage controller 130 may allocate the received write requests to the plurality of flash translation layers FTL0 to FTL3 in a random manner. The random manner allocates write requests to the plurality of flash translation layers FTL0 to FTL3 randomly regardless of logical addresses.

In an example embodiment of the inventive concept, the scramble circuit 131 may allocate the write requests corresponding to the 0-th, fifth, and seventh logical addresses LA0, LA5, and LA7 to the 0-th flash translation layer FTL0, may allocate the write request corresponding to the third logical address LA3 to the first flash translation layer FTL1, may allocate the write requests corresponding to the first and sixth logical addresses LA1 and LA6 to the second flash translation layer FTL2, and may allocate the write requests corresponding to the second and fourth logical addresses LA2 and LA4 to the third flash translation layer FTL3. However, this allocation is merely example, and the inventive concept is not limited thereto. For example, the scramble circuit 131 may allocate the write request corresponding to the third logical address LA3 to the 0-th flash translation layer, the write requests corresponding to the 0-th, fifth, and seventh logical addresses LA0, LA5, and LA7 to the first flash translation layer FTL1, allocate the write requests corresponding to the first and sixth logical addresses LA1 and LA6 to the second flash translation layer FTL2, and allocate the write requests corresponding to the second and fourth logical addresses LA2 and LA4 to the third flash translation layer FTL3.

Pieces of data received from the host 110 may be first stored in the buffer memory 150. Pieces of data respectively corresponding to the 0-th, fifth, and seventh logical addresses LA0, LA5, and LA7 may be stored in the 0-th buffer space B0 managed by the 0-th flash translation layer FTL0. Data corresponding to the third logical address LA3 may be stored in the first buffer space B1 managed by the first flash translation layer FTL1. Pieces of data respectively corresponding to the first and sixth logical addresses LA1 and LA6 may be stored in the second buffer space B2 managed by the second flash translation layer FTL2. Pieces of data respectively corresponding to the second and fourth logical addresses LA2 and LA4 may be stored in the third buffer space B3 managed by the third flash translation layer FTL3.

The data stored in the plurality of buffer spaces B0 to B3 may be stored in the nonvolatile memories NVM00, NVM10, NVM20, and NVM30 through the plurality of channels CH0 to CH3 under control of the flash translation layers FTL0 to FTL3. For example, the pieces of data respectively corresponding to the 0-th, fifth, and seventh logical addresses LA0, LA5, and LA7 may be stored in the 0-th memory group Group0 through the 0-th channel CH0 under control of the 0-th flash translation layer FTL0. The data corresponding to the third logical address LA3 may be stored in the first memory group Group1 through the first channel CH1 under control of the first flash translation layer FTL1. The pieces of data respectively corresponding to the first and sixth logical addresses LA1 and LA6 may be stored in the second memory group Group2 through the second channel CH2 under control of the second flash translation layer FTL2. The pieces of data respectively corresponding to the second and fourth logical addresses LA2 and LA4 may be stored in the third memory group Group3 through the third channel CH3 under control of the third flash translation layer FTL3.

Referring to FIG. 6B, the configuration of the storage system 100 is described above, and thus, additional description will be omitted to avoid redundancy. The host 110 may send write requests for the logical addresses LA0, LA4, LA8, LA12, LA16, LA20, LA24, and LA28 of a specific pattern to the storage device 120.

The storage controller 130 may allocate the received write requests to the plurality of flash translation layers FTL0 to FTL3 in the random manner. In other words, the storage controller 130 may allocate the write requests corresponding to the 0-th and twentieth logical addresses LA0 and LA20 to the 0-th flash translation layer FTL0, may allocate the write requests corresponding to the twelfth and twenty-eighth logical addresses LA12 and LA28 to the first flash translation layer FTL1, may allocate the write requests corresponding to the eighth and twenty-fourth logical addresses LA8 and LA24 to the second flash translation layer FTL2, and may allocate the write requests corresponding to the fourth and sixteenth logical addresses LA4 and LA16 to the third flash translation layer FTL3. This allocation is merely example, and the inventive concept is not limited thereto.

Pieces of data received from the host 110 may be first stored in the buffer memory 150. Pieces of data respectively corresponding to the 0-th and twentieth logical addresses LA0 and LA20 may be stored in the 0-th buffer space B0 managed by the 0-th flash translation layer FTL0. Pieces of data respectively corresponding to the twelfth and twenty-eighth logical addresses LA12 and LA28 may be stored in the first buffer space B1 managed by the first flash translation layer FTL1. Pieces of data respectively corresponding to the eighth and twenty-fourth logical addresses LA8 and LA24 may be stored in the second buffer space B2 managed by the second flash translation layer FTL2. Pieces of data respectively corresponding to the fourth and sixteenth logical addresses LA4 and LA16 may be stored in the third buffer space B3 managed by the third flash translation layer FTL3.

The data stored in the plurality of buffer spaces B0 to B3 may be stored in the nonvolatile memories NVM00, NVM10, NVM20, and NVM30 through the plurality of channels CH0 to CH3 under control of the flash translation layers FTL0 to FTL3. For example, the pieces of data respectively corresponding to the 0-th and twentieth logical addresses LA0 and LA20 may be stored in the 0-th memory group Group0 through the 0-th channel CH0 under control of the 0-th flash translation layer FTL0. The pieces of data respectively corresponding to the twelfth and twenty-eighth logical addresses LA12 and LA28 may be stored in the first memory group Group1 through the first channel CH1 under control of the first flash translation layer FTL1. The pieces of data respectively corresponding to the eighth and twenty-fourth logical addresses LA5 and LA24 may be stored in the second memory group Group2 through the second channel CH2 under control of the second flash translation layer FTL2. The pieces of data respectively corresponding to the fourth and sixteenth logical addresses LA4 and LA16 may be stored in the third memory group Group3 through the third channel CH3 under control of the third flash translation layer FTL3.

Referring to FIG. 6C, the configuration of the storage system 100 is described above, and thus, additional description will be omitted to avoid redundancy. The host 110 may repeatedly send write requests for data corresponding to the same logical address to the storage device 120. In other words, the host 110 may repeatedly send a write request for data corresponding to the 0-th logical address LA0 to the storage device 120. As shown in FIG. 6C, eight write requests are sent from the host 110 to the storage device 120. As described with reference to FIG. 5C, in the case where the storage controller 130 receives a plurality of write requests for the same logical address LA through the FUA or the flush command, the storage controller 130 may not store only data associated with the last write request in the nonvolatile memory device 140, but the storage controller 130 may store all the data associated with the plurality of write requests in the nonvolatile memory device 140.

The storage controller 130 may allocate the received write requests to the plurality of flash translation layers FTL0 to FTL3 in the random manner. In other words, the storage controller 130 may randomly allocate the write requests respectively corresponding to the 0-th logical addresses LA0 received eight times to the plurality of flash translation layers FTL0 to FTL3. For example, first and sixth write requests may be allocated to the 0-th flash translation layer FTL0, third and seventh write requests may be allocated to the first flash translation layer FTL1, 0-th and fourth write requests may be allocated to the second flash translation layer FTL2, and second and fifth write requests may be allocated to the third flash translation layer FTL3. This allocation is merely example, and the inventive concept is not limited thereto.

Pieces of data received from the host 110 may be first stored in the buffer memory 150. Pieces of data respectively corresponding to the first and sixth write requests may be stored in the 0-th buffer space B0 managed by the 0-th flash translation layer FTL0. Pieces of data respectively corresponding to the third and seventh write requests may be stored in the first buffer space B1 managed by the first flash translation layer FTL1. Pieces of data respectively corresponding to the 0-th and fourth write requests may be stored in the second buffer space B2 managed by the second flash translation layer FTL2. Pieces of data respectively corresponding to the second and fifth write requests may be stored in the third buffer space B3 managed by the third flash translation layer FTL3.

The data stored in the plurality of buffer spaces B0 to B3 may be stored in the nonvolatile memories NVM00, NVM10, NVM20, and NVM30 through the plurality of channels CH0 to CH3 under control of the flash translation layers FTL0 to FTL3. For example, the pieces of data respectively corresponding to the first and sixth write requests may be stored in the 0-th memory group Group0 through the 0-th channel CH0 under control of the 0-th flash translation layer FTL0. The pieces of data respectively corresponding to the third and seventh write requests may be stored in the first memory group Group1 through the first channel CH11 under control of the first flash translation layer FTL1. The pieces of data respectively corresponding to the 0-th and fourth write requests may be stored in the second memory group Group2 through the second channel CH2 under control of the second flash translation layer FTL2. The pieces of data respectively corresponding to the second and fifth write requests may be stored in the third memory group Group3 through the third channel CH3 under control of the third flash translation layer FTL3.

As described with reference to FIGS. 5A, 5B, and 5C, when the scramble circuit 131 allocates logical addresses based on the modulo manner, write requests corresponding to sequential logical addresses are uniformly allocated to the plurality of flash translation layers FTL0 to FTL3, and the sequentiality of data may be maintained. Therefore, the performance of the storage device 120 is increased.

In contrast, when the scramble circuit 131 allocates logical addresses based on the modulo manner, as shown in FIG. 5B, write requests corresponding to logical addresses of a specific pattern may be focused on only one flash translation layer (e.g., the 0-th flash translation layer FTL0). In other words, one flash translation layer may be used to process most of the write requests corresponding to logical addresses of the specific pattern. In this case, the buffer spaces B0 to B3 of the buffer memory 150 may not be uniformly used. For example, only one buffer space (e.g., the 0-th buffer space B0) may be used. In addition, the plurality of channels CH0 to CH3 may not be uniformly used. For example, only one channel (e.g., the 0-th channel CH0) connected with a memory group (e.g., the 0-th memory group Group0) that one flash translation layer (e.g., the 0-th flash translation layer FTL0) controls may be used. As a result, the performance of the storage device 120 may be reduced.

As described with reference to FIGS. 6A, 6B, and 6C, when the scramble circuit 131 allocates logical addresses based on the random manner, write requests corresponding to sequential logical addresses may be allocated to the plurality of flash translation layers FTL0 to FTL3 less uniformly than in the modulo manner. In addition, the scramble circuit 131 may randomly allocate write requests to the plurality of flash translation layers FTL0 to FTL3, thereby causing a decrease of the sequentiality of data. As a result, the performance of the storage device 120 may be reduced.

In contrast, when the scramble circuit 131 allocates logical addresses based on the random manner, as shown in FIG. 6B, because write requests corresponding to logical addresses of a specific pattern are randomly allocated, the write requests may not be focused on one flash translation layer (e.g., the 0-th flash translation layer FTL0), but the write requests may be allocated to the plurality of flash translation layers FTL0 to FTL3 uniformly. As a result, the performance of the storage device 120 may be increased.

In conclusion, when the scramble circuit 131 allocates logical addresses based on the modulo manner, write requests corresponding to logical addresses of a specific pattern may be focused on one flash translation layer. When the scramble circuit 131 allocates logical addresses based on the random manner, the sequentiality of data associated with write requests for sequential logical addresses may decrease, and the write requests may be allocated to the plurality of flash translation layers FTL0 to FTL3 less uniformly than in the modulo manner.

In an example embodiment of the inventive concept, the scramble operation may scramble the logical addresses LA received from the host 110 to generate scrambled logical addresses and may respectively allocate write requests to the plurality of flash translation layers FTL0 to FTL3 based on the scrambled logical addresses. Through the scramble operation, an allocation sequence of the plurality of flash translation layers FTL0 to FTL3 may vary depending on a logical address section. Accordingly, requests may be uniformly allocated to the plurality of flash translation layers FTL0 to FTL3, and the sequentiality of data may be maintained. Therefore, the performance of the storage device 120 is increased. Below, a configuration and an operation of the scramble circuit 131 will be more fully described.

Figure 7A:
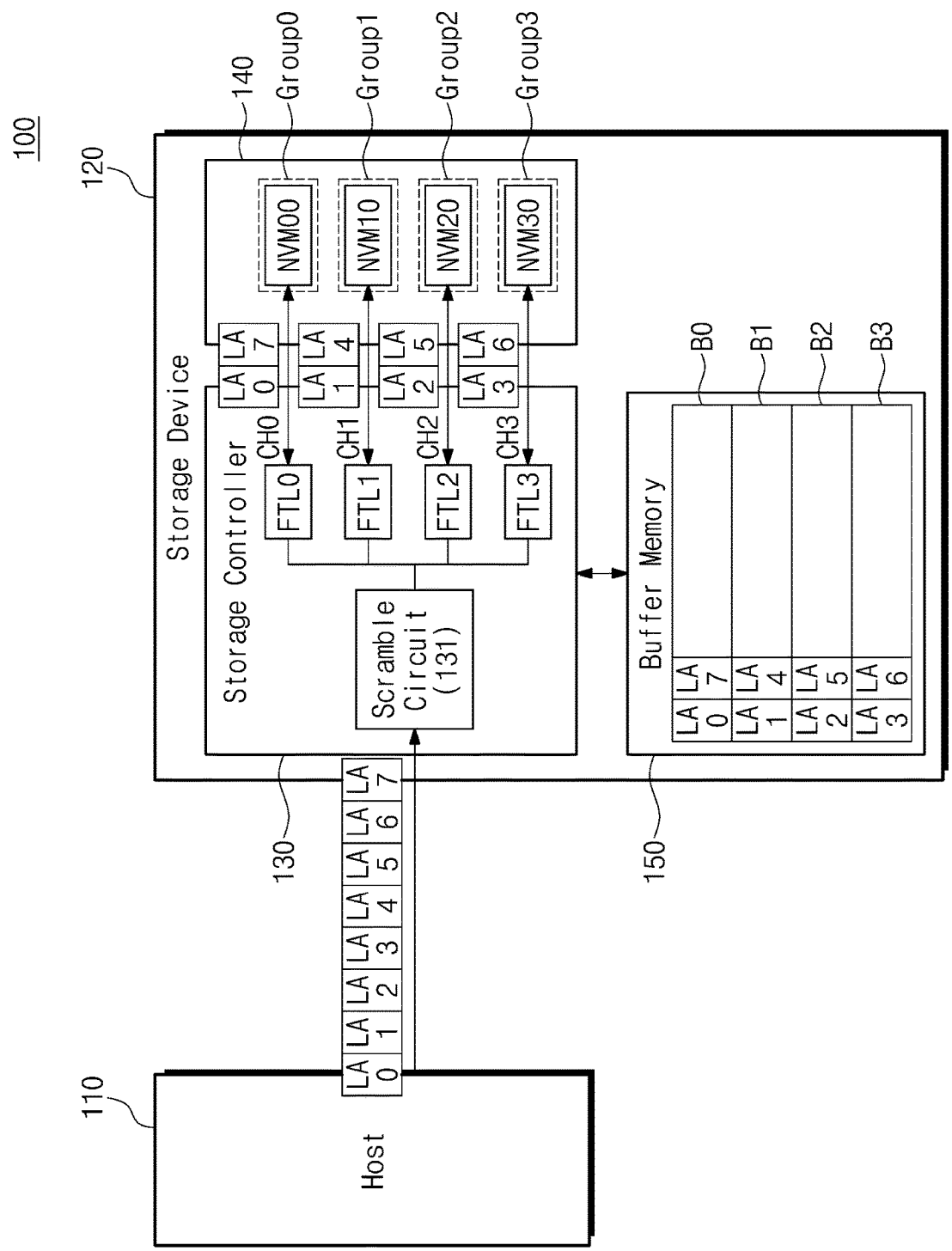
FIGS. 7A, 7B and 7C are diagrams for describing an operation of a scramble circuit of FIG. 1.
Figure 7B:
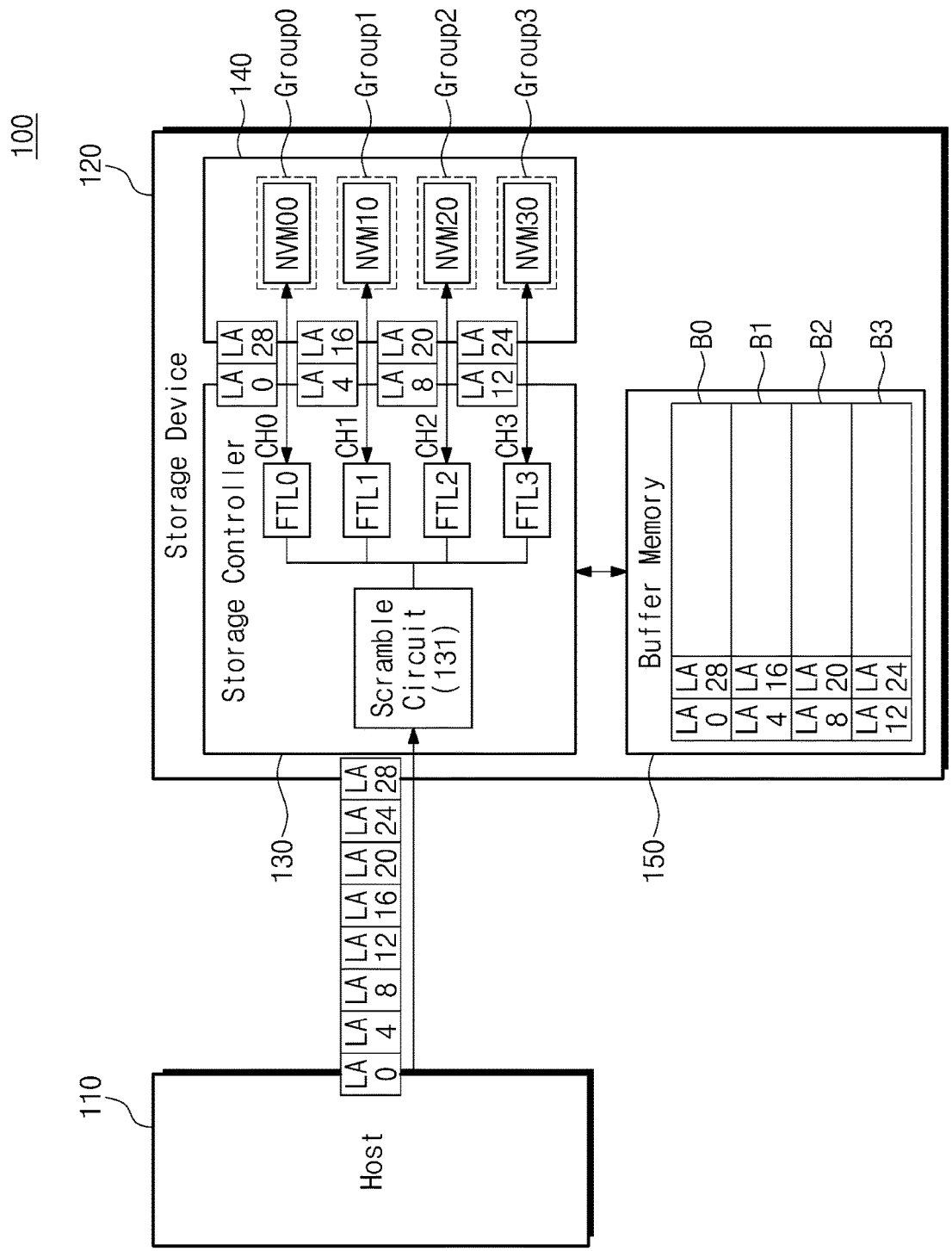
Figure 7C:
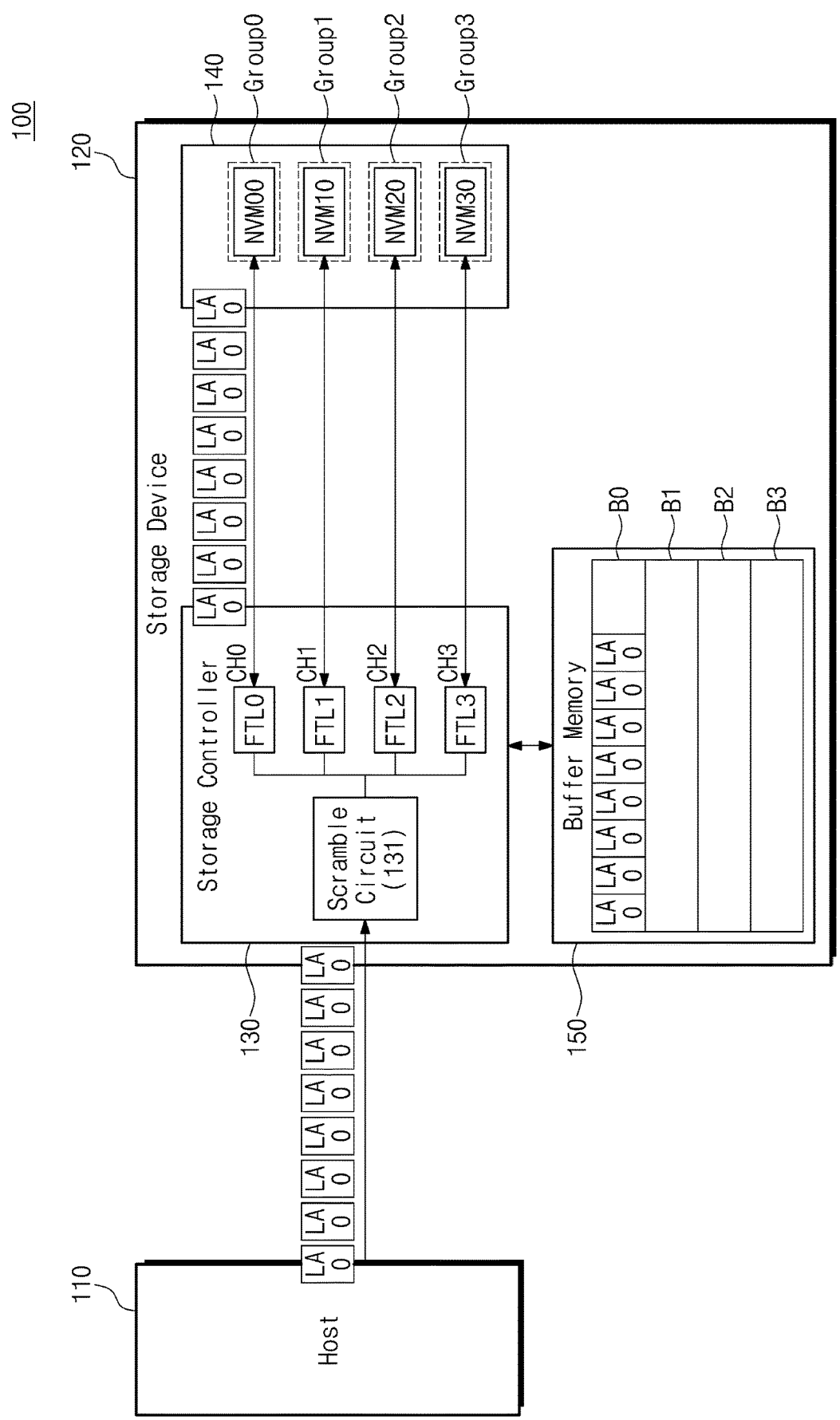

FIGS. 7A to 7C are diagrams for describing an operation of a scramble circuit of FIG. 1. In an example embodiment of the inventive concept, an example of receiving write requests for sequential logical addresses will be described with reference to FIG. 7A, an example of receiving write requests for logical addresses of a specific pattern will be described with reference to FIG. 7B, and an example of repeatedly receiving a write request for a specific logical address will be described with reference to FIG. 7C.

Referring to FIG. 7A, the configuration of the storage system 100 is described above, and thus, additional description will be omitted to avoid redundancy. The host 110 may send write requests for sequential logical addresses to the storage device 120. In an example embodiment of the inventive concept, the host 110 may send write requests (e.g., write commands) for data corresponding to the 0-th to seventh logical addresses LA0 to LA7 to the storage device 120. Alternatively, the storage device 120 may fetch a write request (or a write command) and page data stored in a memory of the host 110.

The storage controller 130 may allocate the received write requests to the plurality of flash translation layers FTL0 to FTL3 in a scramble manner. The scramble circuit 131 may divide a logical address range into a plurality of sections each having a given size and may differently set or scramble an allocation sequence of the plurality of flash translation layers FTL0 to FTL3 for each section.

For example, the 0-th to seventh logical addresses LA0 to LA7 may be divided into a plurality of sections. In this case, a plurality of logical addresses may be divided into sections, each of which has a size corresponding to the number of flash translation layers FTL0 to FTL3. In other words, because the number of flash translation layers FTL0 to FTL3 is "4" the 0-th to seventh logical addresses LA0 to LA7 may be divided into a 0-th section and a first section. For example, the 0-th to third logical addresses LA0 to LA3 may be included in the 0-th section, and the fourth to seventh logical addresses LA4 to LA7 may be included in the first section. The 0-th to third logical addresses LA0 to LA3 of the 0-th section may be allocated to the plurality of flash translation layers FTL0 to FTL3 in a first sequence, and the fourth to seventh logical addresses LA4 to LA7 of the first section may be allocated to the plurality of flash translation layers FTL0 to FTL3 in a second sequence different from the first sequence.

For example, as described with reference to FIG. 5A, in the case where the scramble circuit 131 allocates write requests to the plurality of flash translation layers FTL0 to FTL3 based on the modulo manner, each write request may be allocated by a result value of the modulo operation performed on a logical address and the number of flash translation layers FTL0 to FTL3 (e.g., a result value of A mod M). As a result, in the respective sections, the first addresses (e.g., LA0 and LA4) may be allocated to the 0-th flash translation layer FTL0, the second addresses (e.g., LA1 and LA5) may be allocated to the first flash translation layer FTL1, the third addresses (e.g., LA2 and LA6) may be allocated to the second flash translation layer FTL2, and the fourth addresses (e.g., LA3 and LA7) may be allocated to the third flash translation layer FTL3.

In contrast, the scramble circuit 131 of FIG. 7A may scramble logical addresses to generate scrambled logical addresses and may allocate each write request based on a result value of the modulo operation performed on each of the scrambled logical addresses and the number of flash translation layers (e.g., a result value of SA mod M: "SA" indicating a value of a scrambled logical address and "M" indicating the number of flash translation layers). As a result, an order in which write requests corresponding to logical addresses are allocated to the plurality of flash translation layers FTL0 to FTL3 may change for each section.

In an example embodiment of the inventive concept, according to the first sequence, the first address (e.g., LA0) of the 0-th section may be allocated to the 0-th flash translation layer FTL0, the second address (e.g., LA1) of the 0-th section may be allocated to the first flash translation layer FTL1, the third address (e.g., LA2) of the 0-th section may be allocated to the second flash translation layer FL2, and the fourth address (e.g., LA3) of the 0-th section may be allocated to the third flash translation layer FTL3.

According to the second sequence different from the first sequence, the first address (e.g., LA4) of the first section may be allocated to the first flash translation layer FTL1, the second address (e.g., LA5) of the first section may be allocated to the second flash translation layer FTL2, the third address (e.g., LA6) of the first section may be allocated to the third flash translation layer FTL3, and the fourth address (e.g., LA7) of the first section may be allocated to the 0-th flash translation layer FTL0. This allocation is merely example, and the inventive concept is not limited thereto. For example, a scrambled result (or an allocation sequence) may vary depending on kinds of hash functions, seeds, and the like.

As such, the scramble circuit 131 may change an allocation sequence of write requests corresponding to logical addresses for respective sections.

As a result, unlike the random manner, write requests corresponding to sequential logical addresses may be uniformly allocated to the plurality of flash translation layers FTL0 to FTL3.

Pieces of data received from the host 110 may be first stored in the buffer memory 150. Pieces of data respectively corresponding to the 0-th and seventh logical addresses LA0 and LA7 may be stored in the 0-th buffer space B0 managed by the 0-th flash translation layer FTL0. Pieces of data respectively corresponding to the first and fourth logical addresses LA1 and LA4 may be stored in the first buffer space B1 managed by the first flash translation layer FTL1.

Pieces of data respectively corresponding to the second and fifth logical addresses LA2 and LA5 may be stored in the second buffer space B2 managed by the second flash translation layer FTL2. Pieces of data respectively corresponding to the third and sixth logical addresses LA3 and LA6 may be stored in the third buffer space B3 managed by the third flash translation layer FTL3.

The data stored in the plurality of buffer spaces B0 to B3 may be stored in the nonvolatile memories NVM00, NVM10, NVM20, and NVM30 through the plurality of channels CH0 to CH3 under control of the flash translation layers FTL0 to FTL3. For example, the pieces of data respectively corresponding to the 0-th and seventh logical addresses LA0 and LA7 may be stored in the 0-th memory group Group0 through the 0-th channel CH0 under control of the 0-th flash translation layer FTL0. The pieces of data respectively corresponding to the first and fourth logical addresses LA1 and LA4 may be stored in the first memory group Group1 through the first channel CH1 under control of the first flash translation layer FTL1. The pieces of data respectively corresponding to the second and fifth logical addresses LA2 and LA5 may be stored in the second memory group Group2 through the second channel CH2 under control of the second flash translation layer FTL2. The pieces of data respectively corresponding to the third and sixth logical addresses LA3 and LA6 may be stored in the third memory group Group3 through the third channel CH3 under control of the third flash translation layer FTL3.

As described above, in the case of allocating write requests corresponding to sequential logical addresses based on the scramble manner, the scramble circuit 131 may uniformly allocate the write requests to the plurality of flash translation layers FTL0 to FTL3. In other words, in the case of receiving write requests for eight pages, the scramble circuit 131 may allocate write requests for two pages to each of the plurality of flash translation layers FTL0 to FTL3. Accordingly, the storage controller 130 may uniformly use the plurality of buffer spaces B0 to B3 in the buffer memory 150 and may use the plurality of channels CH0 to CH3 connected with the nonvolatile memory device 140 without the loss of performance.

Referring to FIG. 7B, the configuration of the storage system 100 is described above, and thus, additional description will be omitted to avoid redundancy. The host 110 may send write requests for the logical addresses LA0, LA4, LA8, LA12, LA16, LA20, LA24, and LA28 of a specific pattern to the storage device 120. The scramble circuit 131 may allocate the received write requests to the plurality of flash translation layers FTL0 to FTL3 uniformly in the scramble manner.

As described with reference to FIG. 5B, when the scramble circuit 131 allocates write requests for logical addresses of a specific pattern based on the modulo manner, the write requests may be focused on one flash translation layer (e.g., the 0-th flash translation layer FTL0). In contrast, when the scramble circuit 131 allocates write requests for logical addresses of a specific pattern based on the scramble manner, the write requests may not be focused on only one flash translation layer, but the write requests may be uniformly allocated to a plurality of flash translation layers.

In an example embodiment of the inventive concept, as described with reference to FIG. 7A, a range of logical addresses may be divided into a plurality of sections. In this case, each of the plurality sections has a size corresponding to the number of flash translation layers FTL0 to FTL3. For example, in the case where the number of flash translation layers FTL0 to FTL3 is "4", 0-th to thirty-first logical addresses LA0 to LA31 may be divided into 0-th to seventh sections. For example, the 0-th section may include 0-th to third logical addresses LA0 and LA3, the first section may include fourth to seventh logical addresses LA4 to LA7 . . . , and the seventh section may include twenty-eighth to thirty-first logical addresses LA28 to LA31. In this case, the 0-th, fourth, eighth, twelfth, sixteenth, twentieth, twenty-fourth, and twenty-eighth logical addresses LA0, LA4, LA8, LA12, LA16, LA20, LA24, and LA28 may be the first addresses of the 0-th to seventh sections. In other words, as described with reference to FIG. 5A, in the modulo manner, the first addresses (e.g., LA0, LA4, LA8, LA12, LA16, LA20, LA24, and LA28) of respective sections may be allocated to the 0-th flash translation layer FTL0.

In contrast, as illustrated in FIG. 7B, the scramble circuit 131 to which the scramble manner is applied may scramble logical addresses to generate scrambled logical addresses and may allocate each write request based on a result value of the modulo operation performed on each of the scrambled logical addresses and the number of flash translation layers. As a result, an order in which write requests corresponding to logical addresses are allocated to the plurality of flash translation layers FTL0 to FTL3 may change for each section. Because respective sections have different allocation sequences, when data corresponding to the first addresses of the sections are received, the data may not be focused on the 0-th flash translation layer FTL0, but the data may be uniformly allocated to the plurality of flash translation layers FTL0 to FTL3.

In an example embodiment of the inventive concept, the first address (e.g., LA0) of the 0-th section may be allocated to the 0-th flash translation layer FTL0, the first address (e.g., LA4) of the first section may be allocated to the first flash translation layer FTL1, the first address (e.g., LA8) of the second section may be allocated to the second flash translation layer FTL2, the first address (e.g., LA12) of the third section may be allocated to the third flash translation layer FTL3, the first address (e.g., LA16) of the fourth section may be allocated to the first flash translation layer FTL1, the first address (e.g., LA20) of the fifth section may be allocated to the second flash translation layer FTL2, the first address (e.g., LA24) of the sixth section may be allocated to the third flash translation layer FTL3, and the first address (e.g., LA28) of the seventh section may be allocated to the 0-th flash translation layer FTL0. This allocation is merely example, and the inventive concept is not limited thereto. For example, a scrambled result (or an allocation sequence) may vary depending on kinds of hash functions, seeds, and the like.

In other words, the scramble circuit 131 may differently set an allocation sequence for each section such that requests corresponding to the first addresses of respective sections are allocated to the plurality of flash translation layers FTL0 to FTL3, not primarily on the 0-th flash translation layer FTL0. As a result, the scramble circuit 131 may allocate the write requests corresponding to the 0-th and twenty-eighth logical addresses LA0 and LA28 to the 0-th flash translation layer FTL0, may allocate the write requests corresponding to the fourth and sixteenth logical addresses LA4 and LA16 to the first flash translation layer FTL1, may allocate the write requests corresponding to the eighth and twentieth logical addresses LA5 and LA20 to the second flash translation layer FTL2, and may allocate the write requests corresponding to the twelfth and twenty-fourth logical addresses LA12 and LA24 to the third flash translation layer FTL3.

Pieces of data received from the host 110 may be first stored in the buffer memory 150. Pieces of data respectively corresponding to the 0-th and twenty-eighth logical addresses LA0 and LA28 may be stored in the 0-th buffer space B0 managed by the 0-th flash translation layer FTL0. Pieces of data respectively corresponding to the fourth and sixteenth logical addresses LA4 and LA16 may be stored in the first buffer space B1 managed by the first flash translation layer FTL1. Pieces of data respectively corresponding to the eighth and twentieth logical addresses LA8 and LA20 may be stored in the second buffer space B2 managed by the second flash translation layer FTL2. Pieces of data respectively corresponding to the twelfth and twenty-fourth logical addresses LA12 and LA24 may be stored in the third buffer space B3 managed by the third flash translation layer FTL3.

The data stored in the plurality of buffer spaces B0 to B3 may be stored in the nonvolatile memories NVM00, NVM10, NVM20, and NVM30 through the plurality of channels CH0 to CH3. The pieces of data respectively corresponding to the 0-th and twenty-eighth logical addresses LA0 and LA28 may be stored in the 0-th memory group Group0 through the 0-th channel CH0. The pieces of data respectively corresponding to the fourth and sixteenth logical addresses LA4 and LA16 may be stored in the first memory group Group1 through the first channel CH1. The pieces of data respectively corresponding to the eighth and twentieth logical addresses LA5 and LA20 may be stored in the second memory group Group2 through the second channel CH2. The pieces of data respectively corresponding to the twelfth and twenty-fourth logical addresses LA12 and LA24 may be stored in the third memory group Group3 through the third channel CH3.

As described above, when the scramble circuit 131 allocates write requests for logical addresses of a specific pattern based on the scramble manner, the write requests may not be focused on only one flash translation layer, but the write requests may be uniformly allocated to the plurality of flash translation layers FTL0 to FTL3. In other words, in the case of receiving write requests for eight pages, the scramble circuit 131 may allocate write requests for two pages to each of the plurality of flash translation layers FTL0 to FTL3. Accordingly, the storage controller 130 may uniformly use the plurality of buffer spaces B0 to B3 in the buffer memory 150 and may use the plurality of channels CH0 to CH3 connected with the nonvolatile memory device 140 without the loss of performance.

As such, the storage controller 130 according to an example embodiment of the inventive concept may uniformly allocate both write requests for sequential logical addresses and write requests for logical addresses of a specific pattern to a plurality of flash translation layers. As a result, data may not be mostly provided to a specific channel of a plurality of channels, and thus, the performance of the storage device 120 may be increased.

Referring to FIG. 7C, the configuration of the storage system 100 is described above, and thus, additional description will be omitted to avoid redundancy. The host 110 may repeatedly send write requests for data corresponding to the same logical address to the storage device 120. As described with reference to FIG. 5C, the host 110 may send a command including the FUA or a flush command. Accordingly, even though a plurality of write requests for the same logical address are received and data associated with the plurality of write requests are not yet stored in the nonvolatile memory device 140, the storage controller 130 may not store only the data associated with the last write request in the nonvolatile memory device 140, but the storage controller 130 may store all the data in the nonvolatile memory device 140.

The scramble circuit 131 may allocate the received write requests to the plurality of flash translation layers FTL0 to FTL3 in the scramble manner. In other words, the scramble circuit 131 may allocate all the write requests respectively corresponding to the 0-th logical addresses LA0 received eight times to the 0-th flash translation layer FTL0. Accordingly, all the eight data corresponding to the 0-th logical addresses LA0 may be stored in the 0-th buffer space B0 managed by the 0-th flash translation layer FTL0. The eight data corresponding to the 0-th logical address LA0 may be stored in the 0-th memory group Group0 through the 0-th channel CH0 under control of the 0-th flash translation layer FTL0.

As described above, when the scramble circuit 131 allocates a plurality of write requests for a specific logical address based on the scramble manner, unlike the random manner, the write requests may be focused on only one flash translation layer (e.g., the 0-th flash translation layer FTL0).

Figure 8:
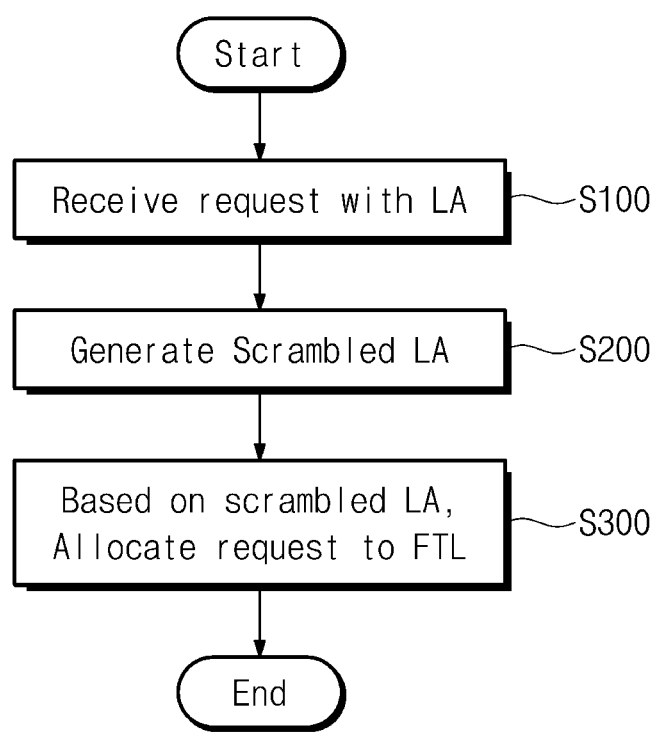
FIG. 8 is a flowchart illustrating an operation of a storage controller of FIG. 1.

FIG. 8 is a flowchart illustrating an operation of a storage controller of FIG. 1. Referring to FIGS. 1, 7B, and 8, in operation S100, the storage controller 130 may receive a request (e.g., a command) including the logical address LA from the host 110. The logical address LA provided from the host 110 may include the logical addresses LA0, LA4, LA8, LA12, LA16, LA20, LA24, and LA28 of a specific pattern. For example, the storage controller 130 may receive a write or read request from the host 110. Alternatively, the storage controller 130 may fetch a request from a memory of the host 110. The storage controller 130 may receive or fetch data corresponding to the received requests.

In operation S200, the scramble circuit 131 of the storage controller 130 may scramble the logical address LA to generate a scrambled logical address LA_sc. In an example embodiment of the inventive concept, the scramble circuit 131 may scramble a portion of the logical address LA to generate the scrambled logical address LA_sc. This will be more fully described with reference to FIG. 9.

In operation S300, the scramble circuit 131 may allocate a request associated with the logical address LA to one of the plurality of flash translation layers FTL0 to FTL3 or one of the plurality of groups Group0 to Group3 based on the scrambled logical address LA_sc. For example, the storage controller 130 may perform the modulo operation on the scrambled logical address LA_sc or a portion of the scrambled logical address LA_sc and the number of flash translation layers and may generate a result value of the modulo operation. The storage controller 130 may allocate the request to one of the plurality of flash translation layers FTL0 to FTL3 based on the result value.

For example, the storage controller 130 may allocate requests corresponding to a result value of "0" to the 0-th flash translation layer FTL0, may allocate requests corresponding to a result value of "1" to the first flash translation layer FTL1, may allocate requests corresponding to a result value of "2" to the second flash translation layer FTL2, and may allocate requests corresponding to a result value of "3" to the third flash translation layer FTL3.

Figure 9:
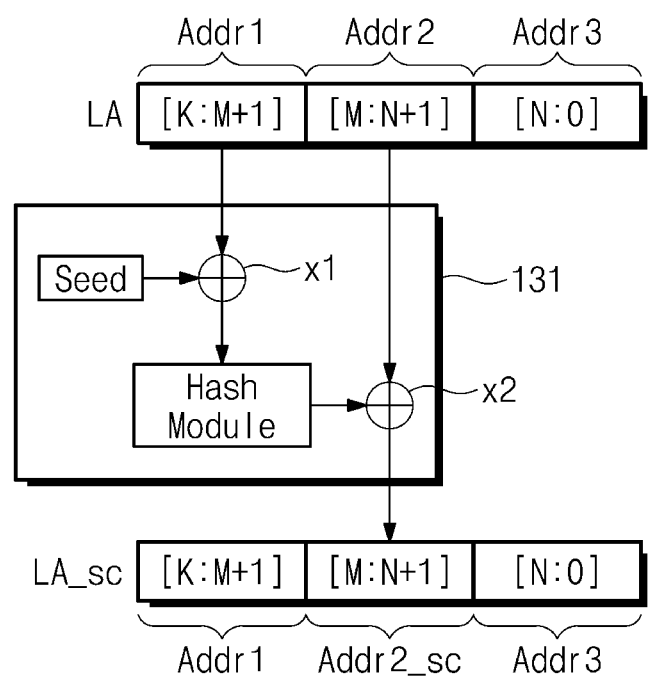
FIG. 9 is a diagram for describing operation S200 of FIG. 8.

FIG. 9 is an example diagram for describing operation S200 of FIG. 8. Referring to FIGS. 1, 7B, and 8, the storage controller 130 may receive a write request including the logical address LA from the host 110. The scramble circuit 131 may scramble the logical address LA to generate the scrambled logical address LA_sc.

The logical address LA may be a (K+1)-bit address (K being a positive number). In an example embodiment of the inventive concept, "K" may be determined based on a storage capacity, a type of host interface, and a basic unit by which a host reads or writes data.

In an example embodiment of the inventive concept, the logical address LA may include a first address part Addr1, a second address part Addr2, and a third address part Addr3. The first, second and third address parts Addr1, Addr2, and Addr3 may be arranged in sequence. The first address part Addr1 may include (M+1)-th to K-th bits [K:M+1] of the logical address LA (M being a positive number). The second address part Addr2 may include (N+1)-th to M-th bits [M:N+1] of the logical address LA (N being a positive number). The third address part Addr3 may include 0-th to N-th bits [N:0] of the logical address LA. In an example embodiment of the inventive concept, "N" may be determined depending on a page size. In an example embodiment of the inventive concept, "M" may be determined depending on the number of flash translation layers. For example, the number of bits of the second address part Addr2 may be $\log_2^B$ (where B indicates the number of flash translation layers).

The third address part Addr3 may indicate a location in a page where data are stored. The storage controller 130 may store data in units of page. Accordingly, the third address part Addr3 may be associated with allocating a physical address. In other words, a physical address may be determined depending on the third address part Addr3.

The second address part Addr2 may be used to select one of a plurality of flash translation layers to be allocated with respect to requests. In an example embodiment of the inventive concept, in the case where the storage controller 130 allocates requests based on the modulo manner, the storage controller 130 may generate a result value by performing the modulo operation on the second address part Addr2 and the number of flash translation layers (e.g., a result value of Addr2 mod M). The storage controller 130 may allocate requests to the plurality of flash translation layers FTL0 to FTL3 and the plurality of memory groups Group0 to Group3 based on result values of the modulo operations. Accordingly, the second address part Addr2 may be associated with allocating a physical address.

The first address part Addr1 may indicate a portion not associated with allocating a physical address to a request in the modulo manner. In other words, in the modulo manner, a physical address may be determined regardless of the first address part Addr1.

When the storage controller 130 allocates requests based on the scramble manner, the storage controller 130 may generate a scrambled second address part Addr2_sc by scrambling only the second address part Addr2. In other words, the scrambled logical address LA_sc may include the original first address part Addr1, the scrambled second address part Addr and the original third address part Addr3. The storage controller 130 may generate a result value by performing the modulo operation on the scrambled second address part Addr2_sc and the number of flash translation layers (e.g., a result value of Addr2 . . . sc mod M). The storage controller 130 may allocate the request to one of the plurality of flash translation layers FTL0 to FTL3 based on the result value.

The scramble circuit 131 may include a first XOR operator x1 a hash module, and a second XOR operator x2 The first and second XOR operators x1 and x2 may be XOR gates, e.g., circuits. The first XOR operator x1 may generate a first intermediate value VAL1 (refer to FIG. 11) by performing an XOR operation on the logical address LA and a seed. Alternatively, the first XOR operator x1 may generate the first intermediate value VAL1 by performing the XOR operation on the seed and a portion of the logical address LA. For example, the first XOR operator x1 may generate the first intermediate value VAL1 by performing the XOR operation on the seed and just the first address part Addr1 of the logical address LA. In an example embodiment of the inventive concept, a portion of the logical address LA may include just the first address part Addr1 or may include both the first and second address parts Addr1 and Addr2 of the logical address LA. However, the inventive concept is not limited thereto. For example, a portion of the logical address LA may include some consecutive bits from among the 0-th to K-bit bits. Alternatively, a portion of the logical address LA may include some non-consecutive bits from among the 0-th to K-bit bits.

In an example embodiment of the inventive concept, the seed may be generated in the process of initializing the storage device 120 and may be changed in a format operation. The seed may be stored in the nonvolatile memory device 140. For example, the seed may be stored in a nonvolatile memory such as an electronic Fuse (eFUSE), an EEPROM, a mask ROM, a serial PROM, or a flash memory. However, the inventive concept is not limited thereto. In an example embodiment of the inventive concept, the seed may be stored in a one-time programmable (OTP) memory of the storage device 120, a meta area of the nonvolatile memory NVM, or the like. The seed may be differently set for each storage device. In this case, even though the same hash manner is applied to storage devices, logical address scrambling manners of the storage devices may be different.

The hash module may generate a second intermediate value VAL2 (refer to FIG. 11) by performing a hash function operation on the first intermediate value VAL1 which is an output of the first XOR operator x1. In an example embodiment of the inventive concept, the hash module may be provided with the first intermediate value VAL1 which is an output of the first XOR operator x1. The hash module may hash the first intermediate value VAL1 thus provided and may generate the second intermediate value VAL2. In an example embodiment of the inventive concept, the hash module may be implemented with a cyclic redundancy check (CRC), an advanced encryption standard (AES), a pseudo random number generator, or the like.

The second XOR operator x2 may perform the XOR operation on the second intermediate value VAL2 and the second address part Addr2. An output value of the second XOR operator x2 may be the scrambled second address part Addr2_sc.

The scrambled logical address LA_sc may include the first address part Addr1 of the logical address LA, the scrambled second address part Addr2_sc, and the third address part Addr3 of the logical address LA. In other words, the first and third address parts Addr1 and Addr3 may not be changed, and only the second address part Addr2 may be changed.

In the storage controller 130, the scrambled logical addresses LA_sc may be used to allocate requests, and the original logical addresses LA may be provided to the plurality of flash translation layers FTL0 to FTL3. In this case, the scrambled second address part Addr2_sc may be stored in a meta area. A storage area of the nonvolatile memory device 140 may be divided into a user area and a meta area. The user area may be used to store data corresponding to a write request received from the host 110. The meta area may be used to store any other information or data except for the data corresponding to the write request received from the host 110.

In another example embodiment of the inventive concept, the storage controller 130 may not send the original logical addresses LA to the plurality of flash translation layers FTL0 to FTL3. Instead, the storage controller 130 may send the scrambled logical address LA_sc to the plurality of flash translation layers FOL to FTL3. In this case, the scrambled second address part Addr2 may be stored in the meta area. Alternatively, the storage controller 130 may not use all the (K+1) bits of the logical address LA depending on a storage capacity of the storage device 120. Accordingly, the storage controller 130 may use a part of unused upper bits of the logical address LA to store the original second address part Addr2.

For example, when an actual storage capacity of a storage device is smaller than a storage capacity capable of being expressed by logical addresses, a maximum logical address of the storage device is capable of being expressed by 0-th to 1-th bits of the logical address (I being less than K). In this case, the storage controller 130 may not use (I+1)-th to K-th bits of the logical address to identify the logical address. Accordingly, the storage controller 130 may store any other information by using the (I+1)-th to K-th bits of the logical address. In an example embodiment of the inventive concept, any other information may include the second address part Addr2 and the scrambled second address part Addr2_sc. In other words, the second address part Addr2 and the scrambled second address part Addr2_sc may be stored by using the (I+1)-th to K-th bits of the logical address, not stored in a separate meta area.

Figure 10A:
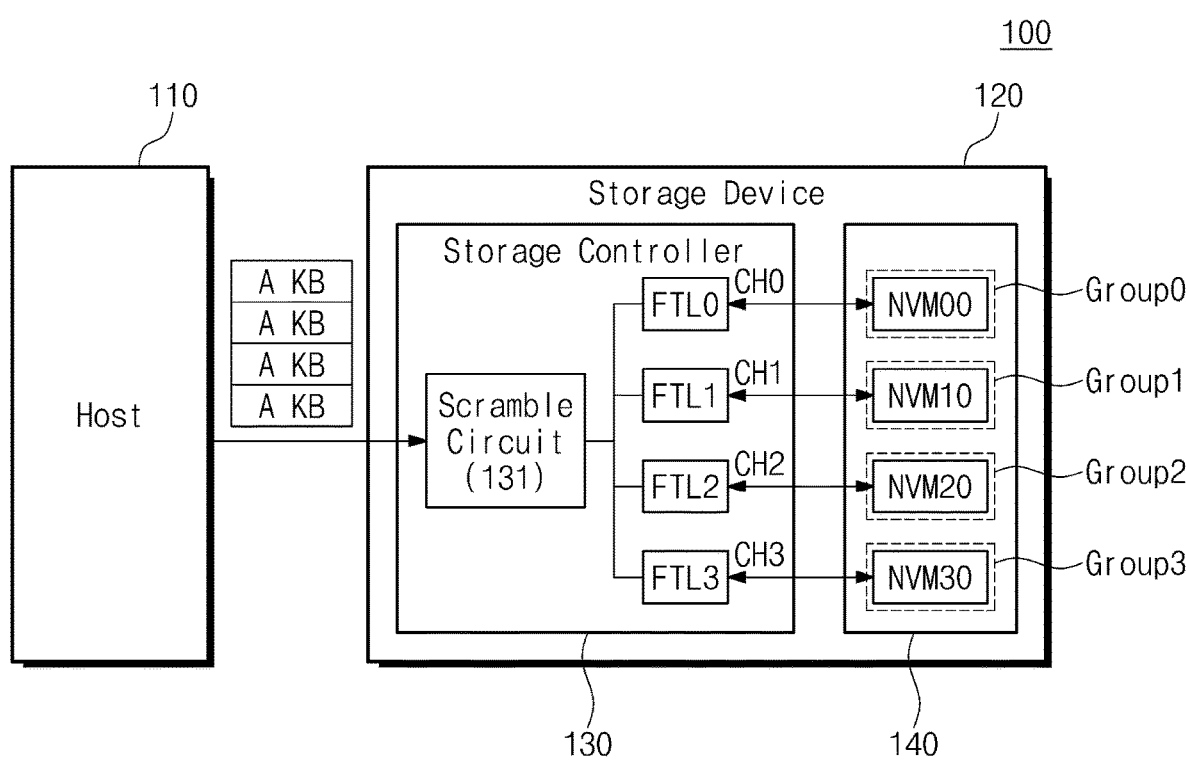
FIG. 10A is a block diagram illustrating a storage system according to an example embodiment of the inventive concept.
Figure 10B:
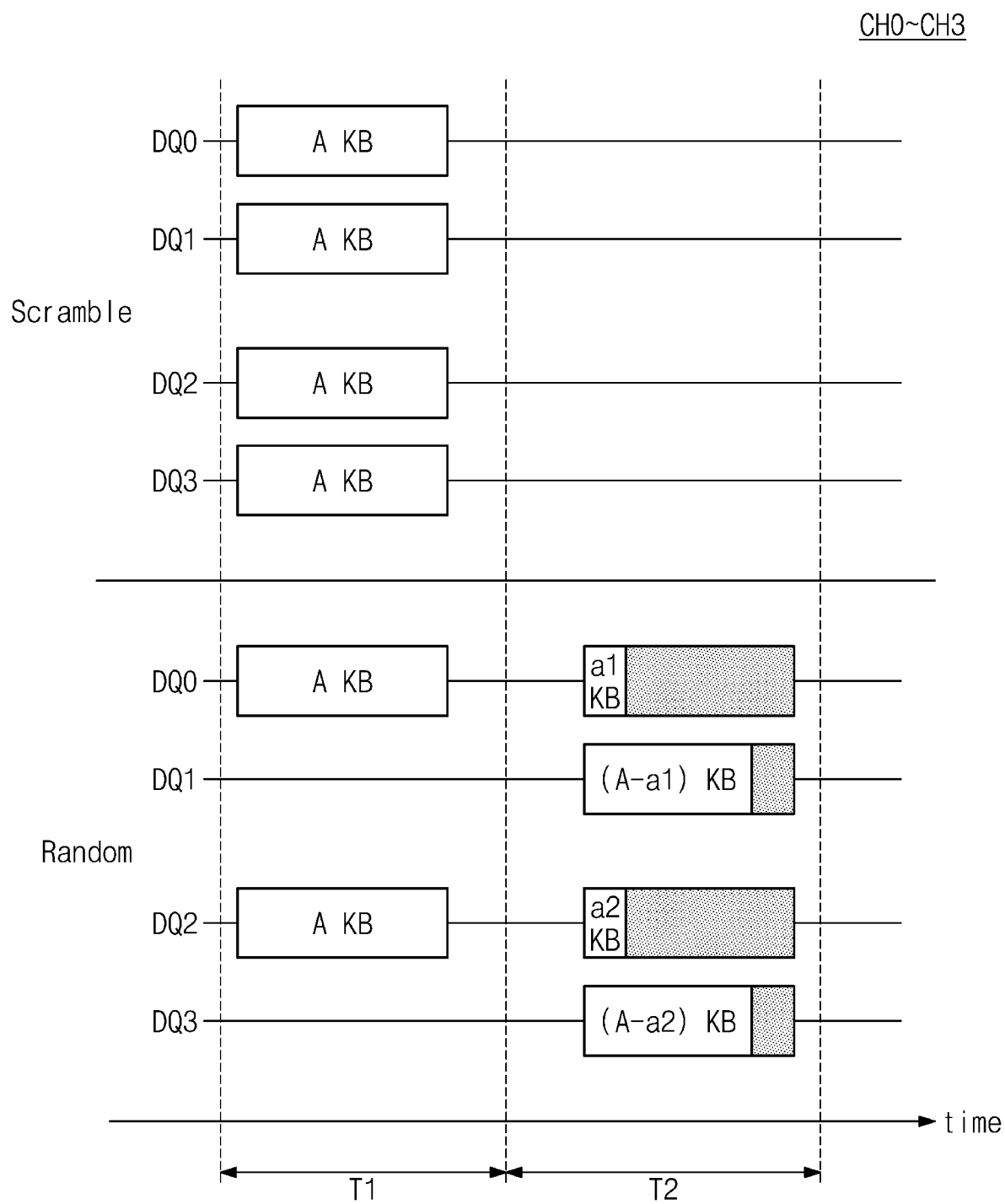
FIG. 10B is a timing diagram illustrating a plurality of channels of FIG. 10A.

FIG. 10A is a block diagram illustrating a storage system according to an example embodiment of the inventive concept. FIG. 10B is a timing diagram illustrating a plurality of channels of FIG. 10A. Referring to FIGS. 3A, 7B, and 10A, the configuration of the storage system 100 is described above, and thus, additional description will be omitted to avoid redundancy.

The host 110 may send write requests corresponding to logical addresses of a specific pattern and data to the storage device 120. In an example embodiment of the inventive concept, the host 110 may send write requests for a total of 4 A KB (A being a positive number) corresponding to logical addresses of a specific pattern to the storage controller 130. The 4 A KB may be a maximum data size capable of being stored simultaneously through channel/plane interleaving. The 4 A KB may be determined based on the number of bits stored per memory cell (e.g., an SLC, an MLC, a TLC, or a QLC) of a nonvolatile memory, a page size, the number of channels, the number of ways, and the number of planes.

Each of the plurality of channels CH0 to CH3 may be based on a NAND interface. Each of the plurality of channels CH0 to CH3 may include a plurality of data lines DQ0, DQ1, DQ2, and DQ3. For example, the 0-th channel CH0 may include 0-th data lines DQ0. The data lines DQ0 may be used to exchange data in synchronization with a data strobe signal. For brevity of drawing, only the plurality of data lines DQ0, DQ1, DQ2, and DQ3 are illustrated in FIG. 10B, but the inventive concept is not limited thereto. For example, fewer or more data lines that those shown in FIG. 10B may be employed in accordance with embodiments of the inventive concept.

When the scramble circuit 131 allocates write requests for logical addresses of a specific pattern based on the scramble manner, the write requests may not be focused on only one memory group, but the write requests may be allocated to the plurality of memory groups Group0 to Group3. In other words, the scramble circuit 131 may allocate write requests for pieces of A-KB data to the plurality of flash translation layers FTL0 to FTL3, respectively.

The 0-th flash translation layer FTL0 may send the A-KB data to the 0-th memory group Group0 through the 0-th data lines DQ0, the first flash translation layer FTL1 may send the A-KB data to the first memory group Group1 through the first data lines DQ1, the second flash translation layer FTL2 may send the A-KB data to the second memory group Group2 through the second data lines DQ2, and the third flash translation layer FTL3 may send the A-KB data to the third memory group Group3 through the third data lines DQ3.

When the scramble circuit 131 allocates write requests for logical addresses of a specific pattern based on the random manner, the write requests may be irregularly allocated to the flash translation layers FTL0 to FTL3 and the memory groups Group0 to Group3. In an example embodiment of the inventive concept, the scramble circuit 131 may allocate a write request for data of (A+a1) KB (a1 being a positive number and a1<A) to the 0-th flash translation layer FTL0, may allocate a write request for data of (A−a1) KB to the first flash translation layer FTL1, may allocate a write request for data of (A+a2) KB (a2 being a positive number and a2<A) to the second flash translation layer FTL2, and may allocate a write request for data of (A−a2) KB to the third flash translation layer FTL3.

Because the A-KB data satisfying a program unit of each of the 0-th and second flash translation layers FTL0 and FTL2 are prepared, during a first time T1, the 0-th flash translation layer FTL0 may send the A-KB data to the 0-th memory group Group0 through the 0-th data lines DQ0, and the second flash translation layer FTL2 may send the A-KB data to the second memory group Group2 through the second data lines DQ2.

Afterwards, during a second time T2, the 0-th flash translation layer FTL0 may send the a1-KB data and dummy data to the 0-th memory group Group0 through the 0-th data lines DQ0. The first flash translation layer FTL1 may send the (A−a1)-KB data and dummy data to the first memory group Group1 through the first data lines DQ1. The second flash translation layer FTL2 may send the a2-KB data and dummy data to the second memory group Group2 through the second data lines DQ2. The third flash translation layer FTL3 may send the (A−a2)-KB data and dummy data to the third memory group Group3 through the third data lines DQ3.

In an example embodiment of the inventive concept, in a program operation of a nonvolatile memory, a time from when programming of the first word line of a specific memory block is performed to when programming of the last word line of the specific memory block is completed is managed within a specific time after the specific memory block is erased. Accordingly, in the case where a write request for data is not additionally received within a given time, the storage controller 130 may write dummy data.

As such, in the scramble manner, the storage controller 130 may uniformly allocate write requests to the flash translation layers FTL0 to FTL3, thus making it possible to send all data during the first time T1. In contrast, in the random manner, the storage controller 130 may irregularly allocate write requests to the flash translation layers FTL0 to FTL3. In this case, the storage controller 130 may send data during the first and second times T1 and T2. In addition, because dummy data are additionally stored as well as data received from the host 110, a loss of a storage space and the reduction of performance may occur.

Figure 11:
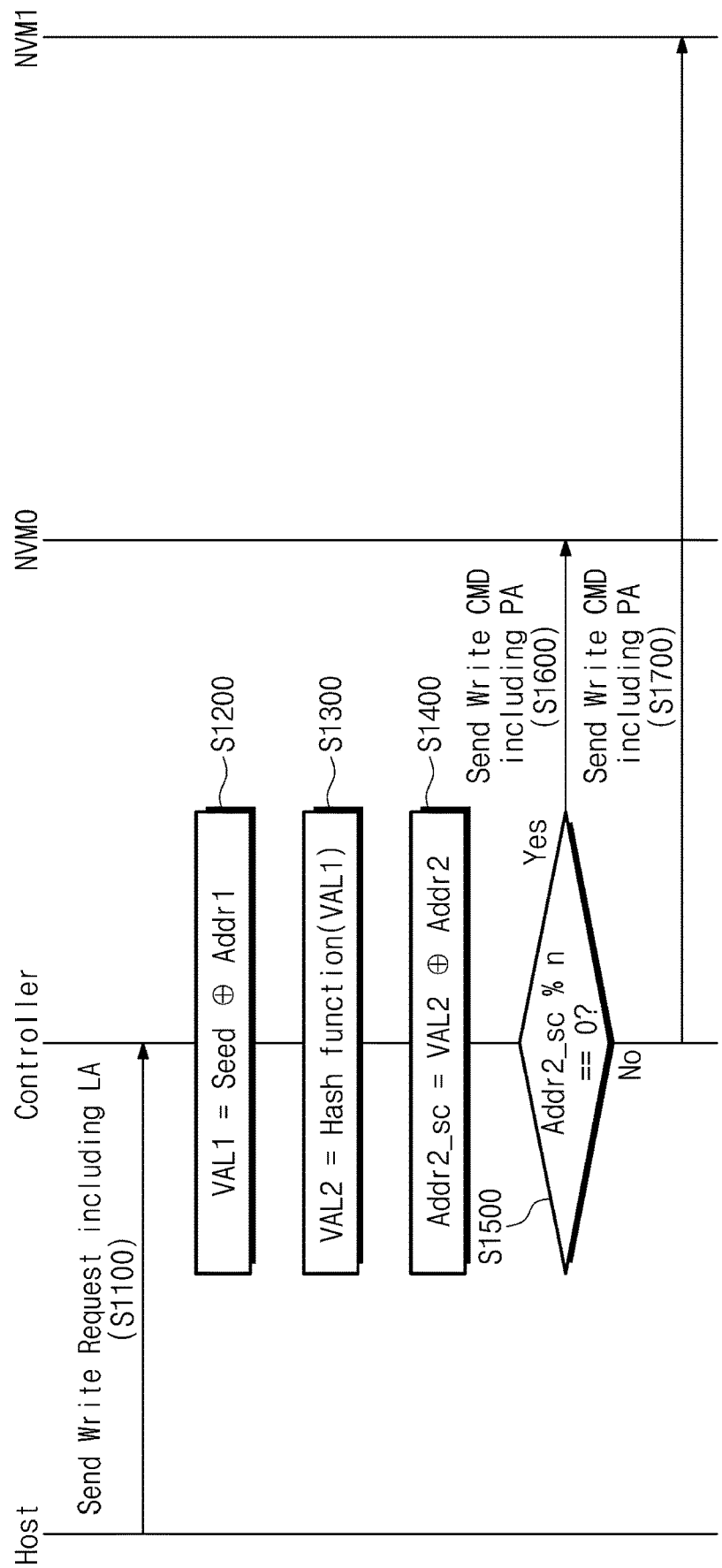
FIG. 11 is a flowchart illustrating an operation of a storage system.

FIG. 11 is a flowchart illustrating an operation of a storage system. For brevity of drawing, only 0-th and first nonvolatile memories NVM0 and NVM1 are illustrated, but the inventive concept is not limited thereto. Referring to FIGS. 1, 9, and 11, in operation S1100, the host 110 may send a write request including the logical address LA to the storage controller 130. In an example embodiment of the inventive concept, the storage controller 130 may fetch a request from a memory of the host 110. The storage controller 130 may receive or fetch data corresponding to the received request. A data structure of a write request may vary depending on a host interface.

In operation S1200, the storage controller 130 may generate the first intermediate value VAL1 by performing the XOR operation on the seed and the first address part Addr1 of the logical address LA. In an example embodiment of the inventive concept, the seed may be differently set for each storage device; alternatively, the seed may be generated in the process of initializing a storage device and may be changed in a format process.

In operation S1300, the storage controller 130 may generate the second intermediate value VAL2 by performing the hash function operation on the first intermediate value VAL1. The hash function operation may be performed using various methods/algorithms such as a cyclic redundancy check (CRC), an advanced encryption standard (AES), and a pseudo random number generator.

In operation S1400, the storage controller 130 may generate the scrambled second address part Addr2_sc by performing the XOR operation on the second intermediate value VAL2 and the second address part Addr2. The first and third address parts Addr1 and Addr3 may not be changed, and only the second address part Addr2 may be scrambled. However, this is merely example and in other embodiments only the first or third address parts Addr1 and Addr3 may be changed to generate a scrambled address.

In operation S1500, the storage controller 130 may allocate the write request to one of a plurality of flash translation layers and one of a plurality of memory groups, based on the scrambled second address part Addr2_sc. In an example embodiment of the inventive concept, the scramble circuit 131 may generate a result value by performing the modulo operation on the scrambled second address part Addr2_sc and the number of flash translation layers (e.g., a result value of Addr2_sc mod M). The storage controller 130 may allocate the write request to one of the plurality of flash translation layers and one of the plurality of memory groups, based on the result value.

In operation S1600, when the result value is "0" the storage controller 130 may send data and a write command including a physical address PA to the 0-th nonvolatile memory NVM0. When the result value is "I", in operation S1700, the storage controller 130 may send the data and the write command including the physical address PA to the first nonvolatile memory NVM1.

FIG. 12A is a diagram illustrating an order of storing data in a modulo manner. Referring to FIGS. 1, 3A, 4, 5A, and 12A, the storage controller 130 may store data corresponding to a write request in the nonvolatile memory device 140. In this case, the data may be distributed and stored in a plurality of nonvolatile memories NVM. This data management manner is called "data interleaving".

For the data interleaving, the nonvolatile memory device 140 may be managed by a channel-way-plane unit. To maximize the deserialization of the nonvolatile memory device 140 connected with the respective channels CH0 to CH3, the storage controller 130 may distribute and allocate consecutive logical memory areas to channels, ways, and planes. In other words, the storage controller 130 may perform channel interleaving, way interleaving, and plane interleaving. For convenience of description, the way interleaving is omitted.

In a table of FIG. 12A, each of numbers 0 to 47 may refer to pieces of page data indicated by a logical address corresponding to a relevant number. For example, "0" may be page data that the 0-th logical address LA0 indicates. In addition, "0" may be page data stored on a least significant bit (LSB) page of the 0-th plane PL0 in the 0-th memory group Group0.

In the case of receiving requests corresponding to sequential logical addresses, the scramble circuit 131 may allocate the received write requests to the plurality of flash translation layers FTL0 to FTL3 and the plurality of memory groups Group0 to Group3 in the modulo manner.

For example, the scramble circuit 131 may generate a result value by performing a modulo operation on a logical address based on the number of flash translation layers FTL0 to FTL3. Result values of 0-th, fourth, eighth, twelfth, sixteenth, twentieth, twenty-fourth, twenty-eighth, thirty-second, thirty-sixth, fortieth, and forty-fourth logical addresses LA0, LA4, LA8, LA12, LA16, LA20, LA24, LA28, LA32, LA36, LA40, and LA44 may be "0", result values of first, fifth, ninth, thirteenth, seventeenth, twenty-first, twenty-fifth, twenty-ninth, thirty-third, thirty-seventh, forty-first, and forty-fifth logical addresses LA1, LA5, LA9, LA13, LA17, LA21, LA25, LA29, LA33, LA37, LA41, and LA45 may be "1", result values of second, sixth, tenth, fourteenth, eighteenth, twenty-second, twenty-sixth, thirtieth, thirty-fourth, thirty-eighth, forty-second, and forty-sixth logical addresses LA2, LA6, LA10, LA14, LA18, LA22, LA26, LA30, LA34, LA38, LA42, and LA46 may be "2", and result values of third, seventh, eleventh, fifteenth, nineteenth, twenty-third, twenty-seventh, thirty-first, thirty-fifth, thirty-ninth, forty-third, and forty-seventh logical addresses LA3, LA7, LA11, LA15, LA19, LA23, LA27, LA31, LA35, LA39, LA43, and LA47 may be "3". Result values may correspond to the numbers in the Group column of FIG. 12A.

The scramble circuit 131 may allocate write requests corresponding to logical addresses LA0, LA4, LA8, LA12, LA16, LA20, LA24, LA28, LA32, LA36, LA40, and LA44, in which a result value of the modulo operation is "0", to the 0-th flash translation layer FTL0 and the 0-th memory group Group0, may allocate write requests corresponding to logical addresses LA1, LA5, LA9, LA13, LA17, LA21, LA25, LA29, LA33, LA37, LA41, and LA45, in which a result value of the modulo operation is "1", to the first flash translation layer FTL1 and the first memory group Group1, may allocate write requests corresponding to logical addresses LA2, LA6, LA10, LA14, LA18, LA22, LA26, LA30, LA34, LA38, LA42, and LA46, in which a result value of the modulo operation is "2", to the second flash translation layer FTL2 and the second memory group Group2, and may allocate write requests corresponding to logical addresses LA3, LA7, LA11, LA15, LA19, LA23, LA27, LA31, LA35, LA39, LA43, and LA47, in which a result value of the modulo operation is "3", to the third flash translation layer FTL3 and the third memory group Group3.

As such, as described with reference to FIG. 7A, the 0-th to forty-seventh logical addresses LA0 to LA47 may be divided into a plurality of sections each being equal in size to the number of flash translation layers. In other words, the 0-th to forty-seventh logical addresses LA0 to LA47 may be divided into 0-th to eleventh sections. In this case, in the respective sections, the first addresses LA0, LA4, LA8, LA12, LA16, LA20, LA24, LA28, LA32, LA36, LA40, and LA44 may be allocated to the 0-th memory group Group0, the second addresses LA), LA5, LA9, LA13, LA17, LA21, LA25, LA29, LA33, LA37, LA41, and LA45 may be allocated to the first memory group Group1, the third addresses LA2, LA6, LA10, LA14, LA18, LA22, LA26, LA30, LA34, LA38, LA42, and LA46 may be allocated to the second memory group Group2, and the fourth addresses LA3, LA7, LA11, LA15, LA19, LA23, LA27, LA31, LA35, LA39, LA43, and LA47 may be allocated to the third memory group Group3. As such, the scramble circuit 131 may perform channel interleaving by allocating requests to a plurality of memory groups based on the modulo manner.

Each of the plurality of flash translation layers FTL0 to FTL3 may perform plane interleaving on received requests. For example, the 0-th flash translation layer FTL0 may receive requests corresponding to the logical addresses LA0, LA4, LA8, LA12, LA16, LA20, LA24, LA28, LA32, LA36, LA40, and LA44. The 0-th flash translation layer FTL0 may perform plane interleaving in the order of receiving requests. Accordingly, the write requests corresponding to the 0-th, sixteenth, and thirty-second logical addresses LA0, LA16, and LA32 may be allocated to the 0-th plane PL0, the write requests corresponding to the fourth, twentieth, and thirty-sixth logical addresses LA4, LA20, and LA36 may be allocated to the first plane PL1, the write requests corresponding to the eighth, twenty-fourth, and fortieth logical addresses LA8, LA24, and LA40 may be allocated to the second plane PL2, and the write requests corresponding to the twelfth, twenty-eighth, and forty-fourth logical addresses LA12, LA28, and LA44 may be allocated to the third plane PL3. As in the above description, the remaining flash translation layers FTL1 to FTL3 may perform plane interleaving, and thus, additional descriptions will be omitted to avoid redundancy.

In the case where the number of bits stored per memory cell of a nonvolatile memory is "3" (e.g., in the case of a TLC), pieces of data respectively corresponding to the logical addresses LA0, LA16, and LA32 allocated to the 0-th plane PL0 may be stored in the order of receiving data as follows. For example, the data corresponding to the 0-th logical address LA0 may be stored at an LSB page (marked by "L" in the 0-th plane PL0 column), the data corresponding to the sixteenth logical address LA16 may be stored at a center significant bit (CSB) page (marked by "C" in the 0-th plane PL0 column), and the data corresponding to the thirty-second logical address LA32 may be stored at a most significant bit (MSB) page (marked by "M" in the 0-th plane PL0 column). As in the above description, pieces of data allocated to the first to third planes PL1 to PL3 may be stored at LSB, CSB, and MSB pages, and thus, additional descriptions will be omitted to avoid redundancy.

Data interleaving associated with a 4-channel, 1-way and 4-plane structure is described above, but the inventive concept is not limited thereto.

FIG. 12B is a diagram illustrating an order of storing data, according to an example embodiment of the inventive concept. Referring to FIGS. 1, 3A, 4, 7A, and 12B, the scramble circuit 131 may perform a data interleaving operation. The scramble circuit 131 may allocate write requests for sequential logical addresses to the plurality of flash translation layers FTL0 to FTIL3 in an order different from that of FIG. 12A. The meaning of numbers illustrated in a table of FIG. 12B are similar to those described with reference to FIG. 12A, and thus, additional descriptions will be omitted to avoid redundancy.

As described with reference to FIG. 12A, the scramble circuit 131 may allocate write requests to a plurality of flash translation layers and a plurality of groups based on the modulo manner as follows. The 0-th to forty-seventh logical addresses LA0 to LA47 may be divided into 0-th to eleventh sections. In this case, in the respective sections, the first addresses LA0, LA4, LA8, LA12, LA16, LA20, LA24, LA28, LA32, LA36, LA40, and LA44 may be allocated to the 0-th memory group Group0, the second addresses LA1, LA5, LA9, LA13, LA17, LA21, LA25, LA29, LA33, LA37, LA41, and LA45 may be allocated to the first memory group Group1, the third addresses LA2, LA6, LA10, LA14, LA18, LA22, LA26, LA30, LA34, LA38, LA42, and LA46 may be allocated to the second memory group Group2, and the fourth addresses LA3, LA7, LA11, LA15, LA19, LA23, LA27, LA31, LA35, LA39, LA43, and LA47 may be allocated to the third memory group Group3.

In contrast, the scramble circuit 131 according to an example embodiment of the inventive concept may scramble the logical address LA to generate the scrambled logical address LA_sc. The storage controller 130 may allocate a write request to one of the plurality of flash translation layers FTL0 to FTL3 and one of the plurality of groups Group0 to Group3 based on the scrambled logical address LA_sc. For example, the scramble circuit 131 may generate a result value by performing the modulo operation on the scrambled logical address LA_sc or the scrambled second address part Addr2_sc. The storage circuit 131 may allocate a write request to one of the plurality of flash translation layers FTL0 to FTL3 and one of the plurality of groups Group0 to Group3 based on the result value. Accordingly, the scramble circuit 131 may allocate write requests to the plurality of flash translation layers FTL0 to FTL3 and the plurality of groups Group0 to Group3 with respect to the 0-th to eleventh sections in different sequences.

In an example embodiment of the inventive concept, the scramble circuit 131 may allocate a request based on a result value of the modulo operation performed on the scrambled logical address LA_sc and the number of flash translation layers. Result values of 0-th, seventh, tenth, thirteenth, nineteenth, twenty-second, twenty-fifth, twenty-eighth, thirty-fifth, thirty-sixth, forty-first, and forty-sixth logical addresses LA0, LA7, LA10, LA13, LA19, LA22, LA25, LA28, LA35, LA36, LA41, and LA46 may be "0", result values of first, fourth, eleventh, fourteenth, sixteenth, twenty-third, twenty-sixth, twenty-ninth, thirty-fourth, thirty-ninth, forty, and forty-fifth logical addresses LA1, LA4, LA11, LA14, LA16, LA23, LA26, LA29, LA34, LA39, LA40, and LA45 may be "1", result values of second, fifth, eighth, fifteenth, seventeenth, twentieth, twenty-seventh, thirtieth, thirty-third, thirty-eighth, forty-third, and forty-fourth logical addresses LA2, LA5, LA8, LA15, LA17, LA20, LA27, LA30, LA33, LA38, LA43, and LA44 may be "2", and result values of third, sixth, ninth, twelfth, eighteenth, twenty-first, twenty-fourth, thirty-first, thirty-second, thirty-seventh, forty-second, and forty-seventh logical addresses LA3, LA6, LA9, LA12, LA18, LA21, LA24, LA31, LA32, LA37, LA42, and LA47 may be "3". This is merely example, and the inventive concept is not limited thereto. For example, a scrambled result (or an allocation sequence) may vary depending on kinds of hash functions, seeds, and the like.

The scramble circuit 131 may allocate write requests corresponding to logical addresses LA0, LA7, LA10, LA13, LA19, LA22, LA25, LA28, LA35, LA36, LA41, and LA46, in which a result value of the modulo operation is "0", to the 0-th flash translation layer FTL0 and the 0-th memory group Group0, may allocate write requests corresponding to logical addresses LA1, LA4, LA11, LA14, LA16, LA23, LA26, LA29, LA34, LA39, LA40, and LA45, in which a result value of the modulo operation is "1", to the first flash translation layer FTL1 and the first memory group Group1, may allocate write requests corresponding to logical addresses LA2, LA5, LA8, LA15, LA17, LA20, LA27, LA30, LA33, LA38, LA43, and LA44, in which a result value of the modulo operation is "2", to the second flash translation layer FTL2 and the second memory group Group2, and may allocate write requests corresponding to logical addresses LA3, LA6, LA9, LA12, LA18, LA21, LA24, LA31, LA32, LA37, LA42, and LA47, in which a result value of the modulo operation is "3", to the third flash translation layer FTL3 and the third memory group Group3.

Accordingly, an order in which write requests corresponding to logical addresses are allocated to the plurality of flash translation layers Group0 to Group3 may change for each section. In an example embodiment of the inventive concept, according to a first sequence, the first address (e.g., LA0) of the 0-th section may be allocated to the 0-th memory group Group0, the second address (e.g., LA1) of the 0-th section may be allocated to the first memory group Group1, the third address (e.g., LA2) of the 0-th section may be allocated to the second memory group Group2, and the fourth address (e.g., LA3) of the 0-th section may be allocated to the third memory group Group3.

According to a second sequence different from the first sequence, the first address (e.g., LA4) of the first section may be allocated to the first memory group Group1, the second address (e.g., LA5) of the first section may be allocated to the second memory group Group2, the third address (e.g., LA6) of the first section may be allocated to the third memory group Group3, and the fourth address (e.g., LA7) of the first section may be allocated to the 0-th memory group Group0. With regard to the second to eleventh sections, requests may be allocated to the plurality of memory groups Group0 to Group3 in different sequences as described above, and thus, additional descriptions will be omitted to avoid redundancy. As such, the scramble circuit 131 may perform channel interleaving by allocating requests to a plurality of memory groups based on the scramble manner.

Each of the plurality of flash translation layers FTL0 to FTL3 may perform plane interleaving on received requests. For example, the 0-th flash translation layer FTL0 may receive requests corresponding to the logical addresses LA0, LA7, LA10, LA13, LA19, LA22, LA25, LA28, LA35, LA36, LA41, and LA46. The 0-th flash translation layer FTL0 may perform plane interleaving in the order of receiving requests. Accordingly, the write requests corresponding to the 0-th, nineteenth, and thirty-fifth logical addresses LA0, LA19, and LA35 may be allocated to the 0-th plane PL0, the write requests corresponding to the seventh, twenty-second, and thirty-sixth logical addresses LA7, LA22, and LA36 may be allocated to the first plane PL1, the write requests corresponding to the tenth, twenty-fifth, and forty-first logical addresses LA10, LA25, and LA41 may be allocated to the second plane PL2, and the write requests corresponding to the thirteenth, twenty-eighth, and forty-sixth logical addresses LA13, LA28, and LA46 may be allocated to the third plane PL3. As in the above description, the remaining flash translation layers FTL1 to FTL3 may perform plane interleaving, and thus, additional descriptions will be omitted to avoid redundancy.

In the case where the number of bits stored per memory cell of a nonvolatile memory is "3" (e.g., in the case of a TLC), pieces of data respectively corresponding to the logical addresses LA0, LA19, and LA35 allocated to the 0-th plane PL0 may be stored in the order of receiving data as follows. For example, the data corresponding to the 0-th logical address LA0 may be stored at an LSB page (marked by "L" in the 0-th plane PL0 column), the data corresponding to the nineteenth logical address LA19 may be stored at a center significant bit (CSB) page (marked by "C" in the 0-th plane PL0 column), and the data corresponding to the thirty-fifth logical address LA35 may be stored at a most significant bit (MSB) page (marked by "M" in the 0-th plane PL0 column). As in the above description, pieces of data allocated to the first to third planes PL1 to PL3 may be stored at LSB, CSB, and MSB pages, and thus, additional descriptions will be omitted to avoid redundancy. Data interleaving associated with a 4-channel, 1-way and 4-plane structure is described above, but the inventive concept is not limited thereto.

Comparing FIG. 12A and FIG. 12B, even though the scramble circuit 131 receives requests for logical addresses of a specific pattern, as described above, the scramble circuit 131 may allocate write requests in different sequences for respective sections such that the write requests are allocated to the plurality of flash translation layers FTL0 to FTL3, rather than being focused on one flash translation layer. Accordingly, optimal performance may be maintained.

Figure 13A:
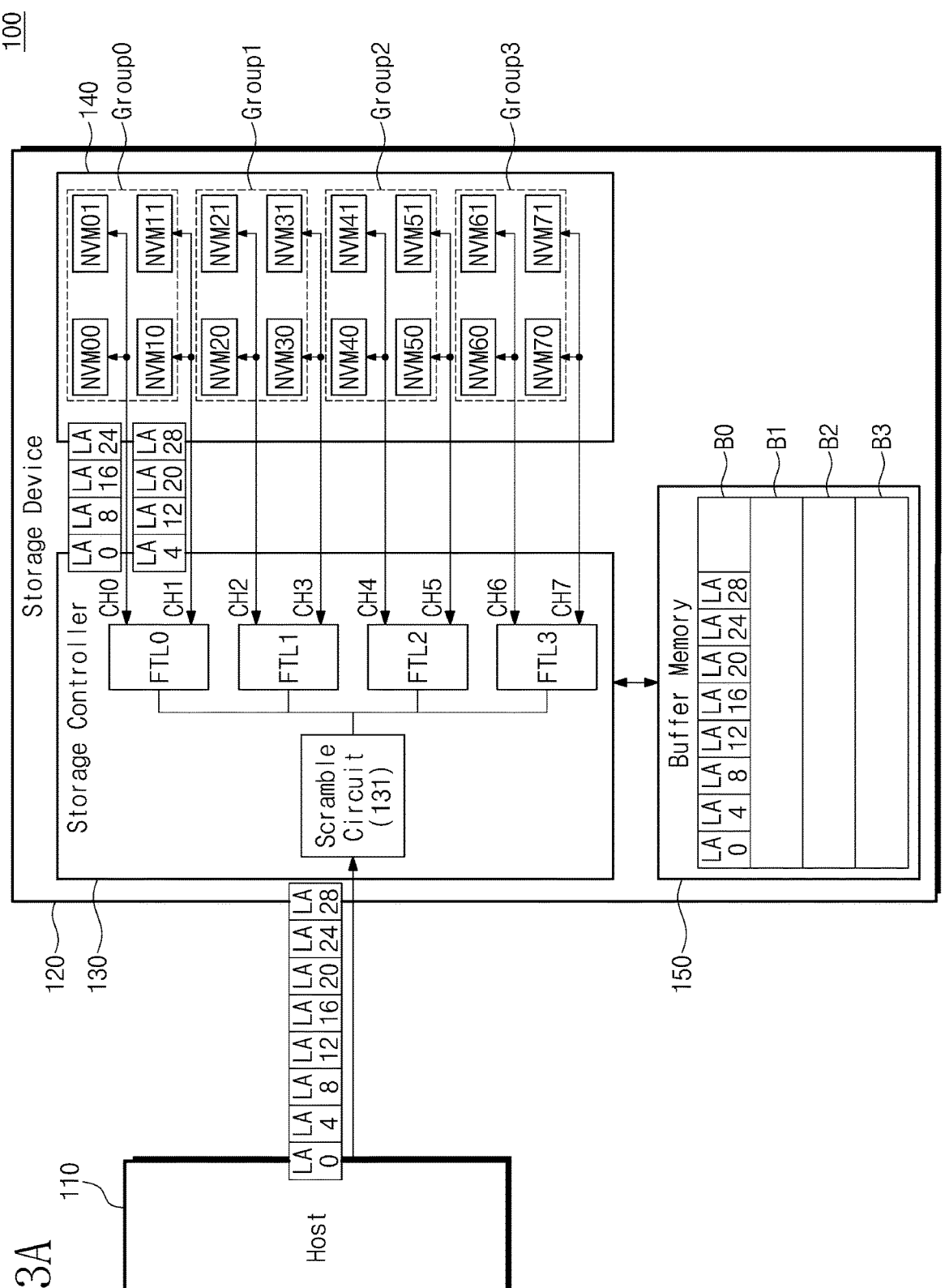
FIGS. 13A, 13B and 13C are diagrams for describing an operation of a scramble circuit of FIG. 1.
Figure 13B:
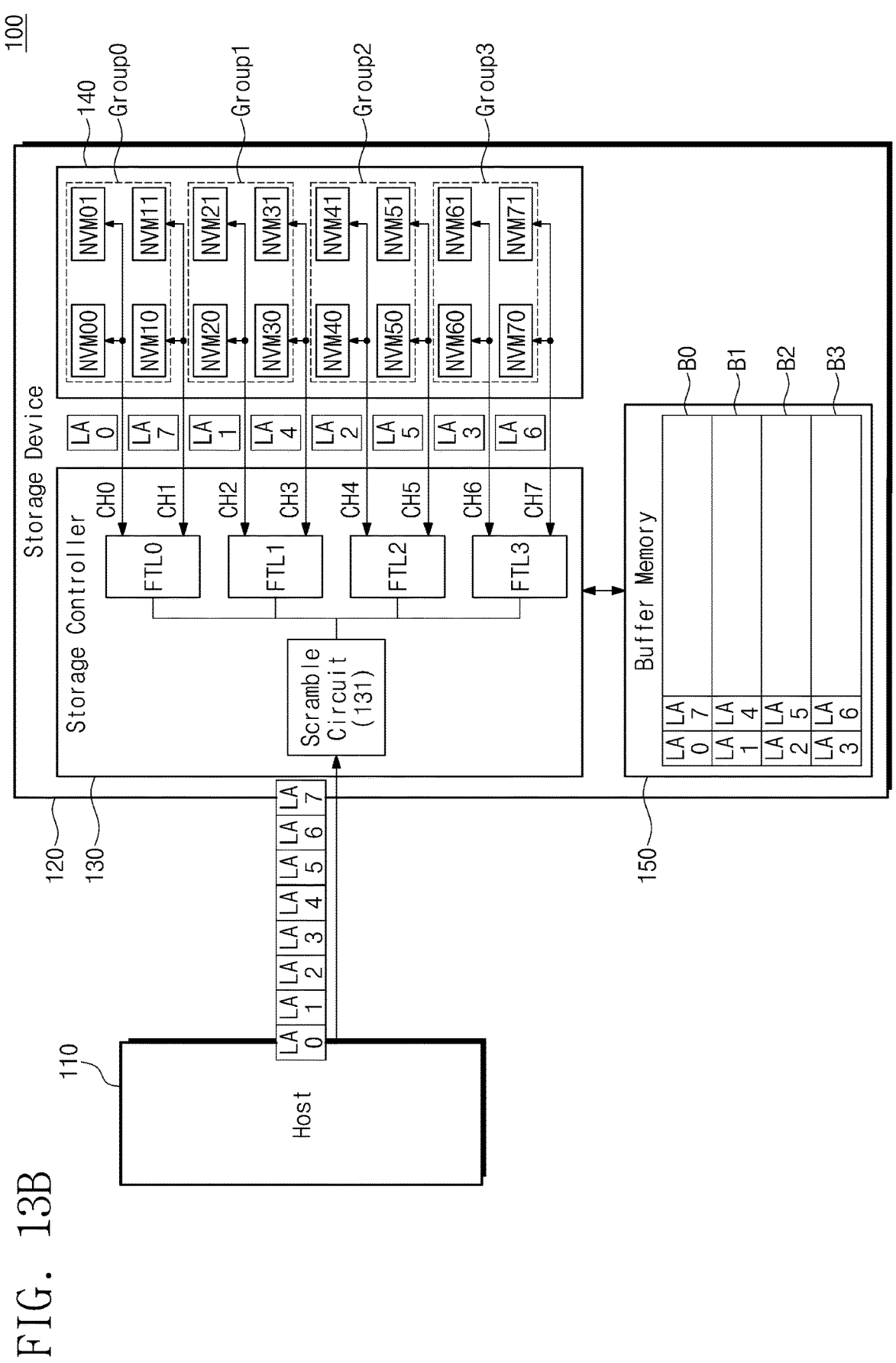
Figure 13C:
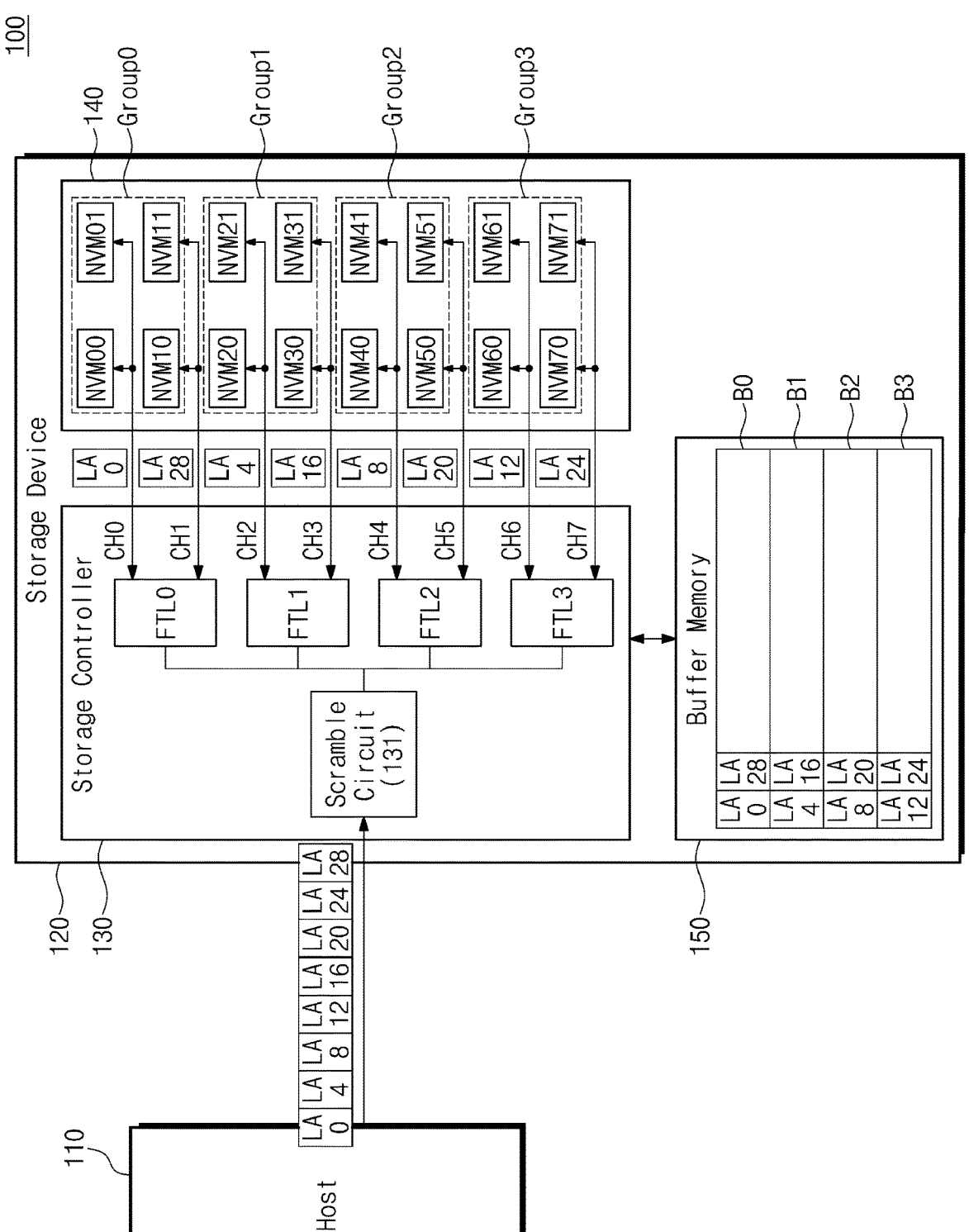

FIGS. 13A to 13C are diagrams for describing an operation of a scramble circuit of FIG. 1. FIG. 13A shows an example of allocating write requests for logical addresses of a specific pattern based on the modulo manner, FIG. 13B shows an example of allocating write requests for sequential logical addresses based on the scramble manner, and FIG. 13C shows an example of allocating write requests for logical addresses of a specific pattern based on the scramble manner.

Referring to FIGS. 3B, 5A, and 13A, the storage system 100 may include the host 110 and the storage device 120. The storage device 120 may include the storage controller 130, the nonvolatile memory device 140, and the buffer memory 150. The storage controller 130 may include the scramble circuit 131 and the plurality of flash translation layers FTL0 to FTL3.

Below, for brevity of drawing and convenience of description, it is assumed that the nonvolatile memory device 140 is implemented according to the topology described with reference to FIG. 3B. In other words, the nonvolatile memory device 140 may include a plurality of nonvolatile memories NVM00 to NVM71. The plurality of nonvolatile memories NVM00 to NVM71 may be divided into a plurality of memory groups. The 0-th memory group Group0 may include the nonvolatile memories NVM00, NVM01, NVM10, and NVM11 connected with the 0-th and first channels CH0 and CH1 from among the plurality of nonvolatile memories NVM00 to NVM71, the first memory group Group1 may include the nonvolatile memories NVM20, NVM21, NVM30, and NVM31 connected with the second and third channels CH2 and CH3 from among the plurality of nonvolatile memories NVM00 to NVM71, the second memory group Group2 may include the nonvolatile memories NVM40, NVM41, NVM50, and NVM51 connected with the fourth and fifth channels CH4 and CH5 from among the plurality of nonvolatile memories NVM00 to NVM71, and the third memory group Group3 may include the nonvolatile memories NVM60, NVM61, NVM70, and NVM71 connected with the sixth and seventh channels CH6 and CH7 from among the plurality of nonvolatile memories NVM00 to NVM71.

The plurality of flash translation layers FTL0 to FTL3 may manage the plurality of memory groups Group0 to Group3, respectively. For example, the 0-th flash translation layer FTL0 may perform various maintenance operations, which are associated with data stored in the 0-th memory group Group0, such as logical-physical mapping table management, bad block management, and wear leveling. The 0-th memory group Group0 may be managed by the 0-th flash translation layer FTL0, the first memory group Group1 may be managed by the first flash translation layer FTL1, the second memory group Group2 may be managed by the second flash translation layer FTL2, and the third memory group Group3 may be managed by the third flash translation layer FTL3.

The host 110 may send requests for logical addresses of a specific pattern to the storage device 120. For example, the host 110 may send data corresponding to 0-th, fourth, eighth, twelfth, sixteenth, twentieth, twenty-fourth, and twenty-eighth logical addresses LA0, LA4, LA8, LA12, LA16, LA20, LA24, and LA28 to the storage device 120.

The scramble circuit 131 may generate a result value by performing the modulo operation on each of the received logical addresses and the number of flash translation layers FTL0 to FTL3 and may allocate each write request to one of the flash translation layers FTL0 to FTL3 based on the generated result value. In the case where the logical addresses LA0, LA4, LA8, LA12, LA16, LA20, LA24, and LA28 have a specific pattern, result values of the modulo operation associated with the logical addresses LA0, LA4, LA8, LA12, LA16, LA20, LA24, and LA28 may be equal (e.g., the result values may be "0"). In this case, the scramble circuit 131 may allocate all the write requests for the logical addresses LA0, LA4, LA8, LA12, LA16, LA20, LA24, and LA28 to one flash translation layer (e.g., the 0-th flash translation layer FTL0). Accordingly, all data respectively corresponding to the 0-th, fourth, eighth, twelfth, sixteenth, twentieth, twenty-fourth, and twenty-eighth logical addresses LA0, LA4, LA8, LA12, LA16, LA20, LA24, and LA28 may be stored in the 0-th buffer space B0 managed by the 0-th flash translation layer FTL0.

Afterwards, pieces of data respectively corresponding to the 0-th, fourth, eighth, twelfth, sixteenth, twentieth, twenty-fourth, and twenty-eighth logical addresses LA0, LA4, LA8, LA12, LA16, LA20, LA24, and LA28 may be stored in the 0-th memory group Group0 through the 0-th and first channels CH0 and CH1 under control of the 0-th flash translation layer FTL0. The pieces of data respectively corresponding to the 0-th, eighth, sixteenth, and twenty-fourth logical addresses LA0, LA8, LA16, and LA24 may be stored in the nonvolatile memories NVM00 and NVM01 through the 0-th channel CH0 under control of the 0-th flash translation layer FTL0. The pieces of data respectively corresponding to the fourth, twelfth, twentieth, and twenty-eighth logical addresses LA4, LA12, LA20, and LA28 may be stored in the nonvolatile memories NVM10 and NVM11 through the first channel CH1 under control of the 0-th flash translation layer FTL0.

Referring to FIGS. 3B, 7A, and 13B, the configuration of the storage system 100 is described above, and thus, additional descriptions will be omitted to avoid redundancy. The host 110 may send write requests for sequential logical addresses to the storage device 120. In an example embodiment of the inventive concept, the host 110 may send write requests (e.g., write commands) for data corresponding to the 0-th to seventh logical addresses LA0 to LA7 to the storage device 120. Alternatively, the storage device 120 may fetch a write request (or a write command) and page data stored in a memory of the host 110.

As described with reference to FIG. 7A, in an example embodiment of the inventive concept, according to the first sequence, the first address (e.g., LA0) of the 0-th section may be allocated to the 0-th flash translation layer FTL0, the second address (e.g., LA1) of the 0-th section may be allocated to the first flash translation layer FTL1, the third address (e.g., LA2) of the 0-th section may be allocated to the second flash translation layer FTL2, and the fourth address (e.g., LA3) of the 0-th section may be allocated to the third flash translation layer FTL3.

According to the second sequence different from the first sequence, the first address (e.g., LA4) of the first section may be allocated to the first flash translation layer FTL1, the second address (e.g., LA5) of the first section may be allocated to the second flash translation layer FTL2, the third address (e.g., LA6) of the first section may be allocated to the third flash translation layer FTL3, and the fourth address (e.g., LA7) of the first section may be allocated to the 0-th flash translation layer FTL0.

Pieces of data received from the host 110 may be first stored in the buffer memory 150. Pieces of data respectively corresponding to the 0-th and seventh logical addresses LA0 and LA7 may be stored in the 0-th buffer space B0 managed by the 0-th flash translation layer FTL0. Pieces of data respectively corresponding to the first and fourth logical addresses LA1 and LA4 may be stored in the first buffer space B1 managed by the first flash translation layer FTL1. Pieces of data respectively corresponding to the second and fifth logical addresses LA2 and LA5 may be stored in the second buffer space B2 managed by the second flash translation layer FTL2. Pieces of data respectively corresponding to the third and sixth logical addresses LA3 and LA6 may be stored in the third buffer space B3 managed by the third flash translation layer FTL3.

The data stored in the plurality of buffer spaces B0 to B3 may be stored in the nonvolatile memories NVM00 to NVM71 through the plurality of channels CH0 to CH7. The pieces of data respectively corresponding to the 0-th and seventh logical addresses LA0 and LA7 may be stored in the 0-th memory group Group0 through the 0-th and first channels CH0 and CH1. The pieces of data respectively corresponding to the first and fourth logical addresses LA1 and LA4 may be stored in the first memory group Group1 through the second and third channels CH2 and CH3. The pieces of data respectively corresponding to the second and fifth logical addresses LA2 and LA5 may be stored in the second memory group Group2 through the fourth and fifth channels CH4 and CH5. The pieces of data respectively corresponding to the third and sixth logical addresses LA3 and LA6 may be stored in the third memory group Group3 through the sixth and seventh channels CH6 and CH7.

Because the 0-th flash translation layer FTL0 controls the 0-th memory group Group0 through the 0-th and first channels CH0 and CH1, data corresponding to the 0-th logical address LA0 may be stored in the nonvolatile memories NVM00 and NVM01 through the 0-th channel CH0, and data corresponding to the seventh logical address LA7 may be stored in the nonvolatile memories NVM10 and NVM11 through the first channel CH1. Because the first flash translation layer FTL1 controls the first memory group Group1 through the second and third channels CH2 and CH3, data corresponding to the first logical address LA1 may be stored in the nonvolatile memories NVM20 and NVM21 through the second channel CH2, and data corresponding to the fourth logical address LA4 may be stored in the nonvolatile memories NVM30 and NVM31 through the third channel CH3. Because the second flash translation layer FTL2 controls the second memory group Group2 through the fourth and fifth channels CH4 and CH5, data corresponding to the second logical address LA2 may be stored in the nonvolatile memories NVM40 and NVM41 through the fourth channel CH4, and data corresponding to the fifth logical address LA5 may be stored in the nonvolatile memories NVM50 and NVM51 through the fifth channel CH5. Because the third flash translation layer FTL3 controls the third memory group Group3 through the sixth and seventh channels CH6 and CH7, data corresponding to the third logical address LA3 may be stored in the nonvolatile memories NVM60 and NVM61 through the sixth channel CH6, and data corresponding to the sixth logical address LA6 may be stored in the nonvolatile memories NVM70 and NVM71 through the seventh channel CH7.

As described above, in the case of allocating write requests corresponding to sequential logical addresses based on the scramble manner, the scramble circuit 131 may uniformly allocate the write requests to the plurality of flash translation layers FTL0 to FTL3. In other words, in the case of receiving write requests for eight pages, the scramble circuit 131 may allocate write requests for two pages to each of the four flash translation layers FTL0 to FTL3. Accordingly, the storage controller 130 may uniformly use the plurality of buffer spaces B0 to B3 in the buffer memory 150 and may use the plurality of channels CH0 to CH7 connected with the nonvolatile memory device 140 without the loss of performance.

Referring to FIGS. 38, 7B, and 13C, the configuration of the storage system 100 is described above, and thus, additional descriptions will be omitted to avoid redundancy. The host 110 may send write requests for the logical addresses LA0, LA4, LA8, LA12, LA16, LA20, LA24, and LA28 of a specific pattern to the storage device 120. The scramble circuit 131 may uniformly allocate the received write requests to the plurality of flash translation layers FTL0 to FTL3 in the scramble manner.

As described with reference to FIG. 7B, the scramble circuit 131 may allocate the write requests corresponding to the 0-th and twenty-eighth logical addresses LA0 and LA28 to the 0-th flash translation layer FTL0, may allocate the write requests corresponding to the fourth and sixteenth logical addresses LA4 and LA16 to the first flash translation layer FTL1, may allocate the write requests corresponding to the eighth and twentieth logical addresses LA8 and LA20 to the second flash translation layer FTL2, and may allocate the write requests corresponding to the twelfth and twenty-fourth logical addresses LA12 and LA24 to the third flash translation layer FTL3.

Pieces of data received from the host 110 may be first stored in the buffer memory 150. Pieces of data respectively corresponding to the 0-th and twenty-eighth logical addresses LA0 and LA28 may be stored in the 0-th buffer space B0 managed by the 0-th flash translation layer FTL0. Pieces of data respectively corresponding to the fourth and sixteenth logical addresses LA4 and LA16 may be stored in the first buffer space B1 managed by the first flash translation layer FTL1. Pieces of data respectively corresponding to the eighth and twentieth logical addresses LA8 and LA20 may be stored in the second buffer space B2 managed by the second flash translation layer FTL2. Pieces of data respectively corresponding to the twelfth and twenty-fourth logical addresses LA12 and LA24 may be stored in the third buffer space B3 managed by the third flash translation layer FTL3.

The data stored in the plurality of buffer spaces B0 to B3 may be stored in the nonvolatile memories NVM00 to NVM71 through the plurality of channels CH0 to CH7 under control of the flash translation layers FTL0 to FTL3. For example, the pieces of data corresponding to the 0-th and twenty-eighth logical addresses LA0 to LA28 may be stored in the 0-th memory group Group0 through the 0-th and first channels CH0 and CH1 under control of the 0-th flash translation layer FTL0. The pieces of data respectively corresponding to the fourth and sixteenth logical addresses LA4 and LA16 may be stored in the first memory group Group1 through the second and third channels CH2 and CH3 under control of the first flash translation layer FTL1. The pieces of data respectively corresponding to the eighth and twentieth logical addresses LA8 and LA20 may be stored in the second memory group Group2 through the fourth and fifth channels CH4 and CH5 under control of the second flash translation layer FTL2. The pieces of data respectively corresponding to the twelfth and twenty-fourth logical addresses LA12 and LA24 may be stored in the third memory group Group3 through the sixth and seventh channels CH6 and CH7 under control of the third flash translation layer FTL3.

Because the 0-th flash translation layer FTL0 controls the 0-th memory group Group0 through the 0-th and first channels CH0 and CH1, data corresponding to the 0-th logical address LA0 may be stored in the nonvolatile memories NVM00 and NVM01 through the 0-th channel CH0, and data corresponding to the twenty-eighth logical address LA28 may be stored in the nonvolatile memories NVM10 and NVM11 through the first channel CH1. Because the first flash translation layer FTL1 controls the first memory group Group1 through the second and third channels CH2 and CH3, data corresponding to the fourth logical address LA4 may be stored in the nonvolatile memories NVM20 and NVM21 through the second channel CH2, and data corresponding to the sixteenth logical address LA16 may be stored in the nonvolatile memories NVM30 and NVM31 through the third channel CH3. Because the second flash translation layer FTL2 controls the second memory group Group2 through the fourth and fifth channels CH4 and CH5, data corresponding to the eighth logical address LA8 may be stored in the nonvolatile memories NVM40 and NVM41 through the fourth channel CH4, and data corresponding to the twentieth logical address LA20 may be stored in the nonvolatile memories NVM50 and NVM51 through the fifth channel CH5. Because the third flash translation layer FTL3 controls the third memory group Group3 through the sixth and seventh channels CH6 and CH7, data corresponding to the twelfth logical address LA12 may be stored in the nonvolatile memories NVM60 and NVM61 through the sixth channel CH6, and data corresponding to the twenty-fourth logical address LA24 may be stored in the nonvolatile memories NVM70 and NVM71 through the seventh channel CH7.

As described above, when the scramble circuit 131 allocates write requests for logical addresses of a specific pattern based on the scramble manner, the write requests may not be focused on only one flash translation layer. For example, the write requests may be uniformly allocated to the plurality of flash translation layers FTL0 to FTL3. In other words, in the case of receiving write requests for eight pages, the scramble circuit 131 may allocate write requests for two pages to each of the plurality of flash translation layers FTL0 to FTL3. Accordingly, the storage controller 130 may uniformly use the plurality of buffer spaces B0 to B3 in the buffer memory 150 and may use the plurality of channels CH0 to CH7 connected with the nonvolatile memory device 140 without the loss of performance.

As such, the storage controller 130 according to an example embodiment of the inventive concept may uniformly allocate both write requests for sequential logical addresses and write requests for logical addresses of a specific pattern to a plurality of flash translation layers. As a result, a phenomenon that data are focused on a specific channel of a plurality of channels may not occur. Since the storage device 120 uniformly allocates write requests to a plurality of resources, the performance of the storage device 120 is increased.

Figure 14:
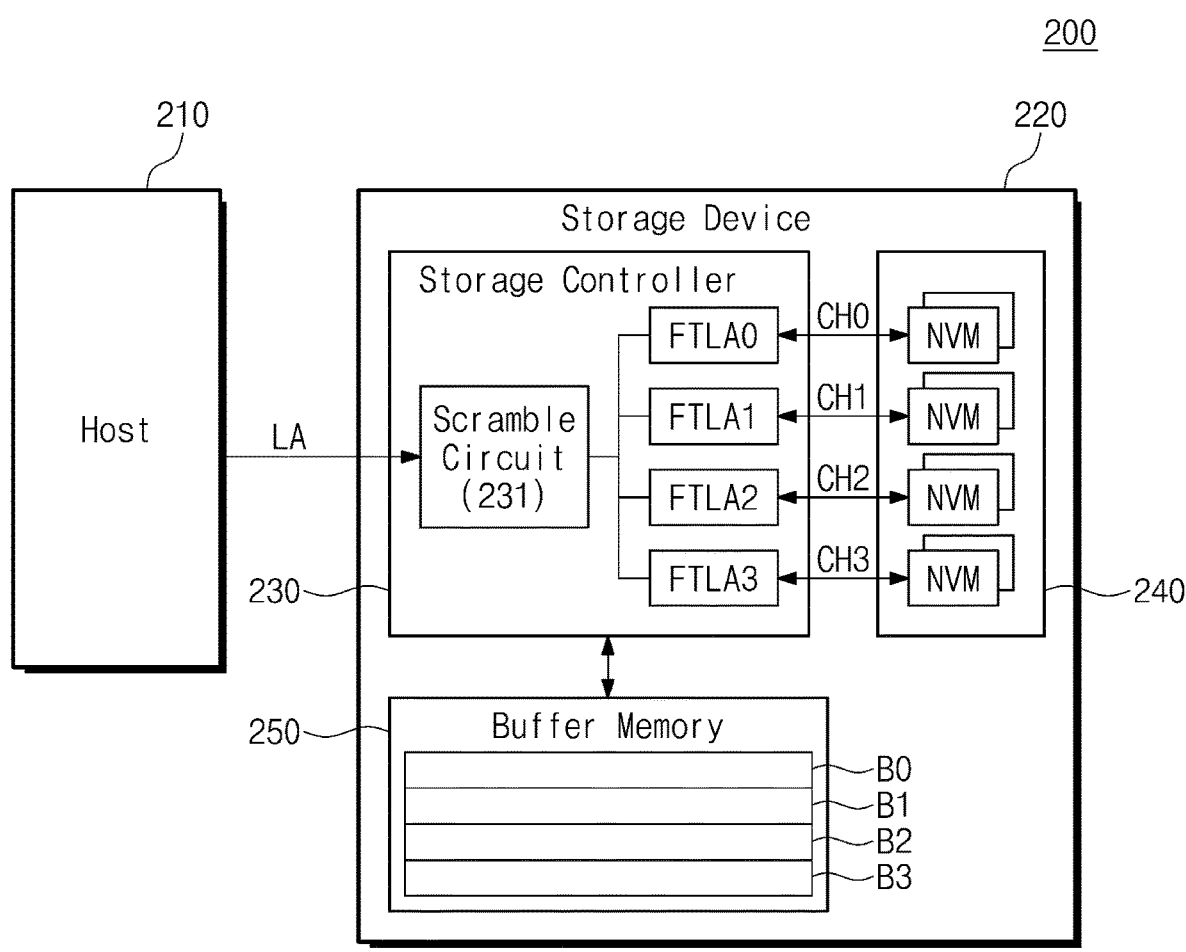
FIG. 14 is a block diagram illustrating a storage system according to an example embodiment of the inventive concept.

FIG. 14 is a block diagram illustrating a storage system according to an example embodiment of the inventive concept. Referring to FIGS. 3A and 14, a storage system 200 may include a host 210 and a storage device 220. The storage device 220 may include a storage controller 230, a nonvolatile memory device 240 including a plurality of nonvolatile memories NVM, and a buffer memory 250. The nonvolatile memory devices 240 are described above (see e.g., 140 in FIG. 1), and thus, additional descriptions will be omitted to avoid redundancy.

The storage controller 230 may include a scramble circuit 231 and a plurality of flash translation layer accelerators FTLA0 to FTLA3. The scramble circuit 231 is described above, and thus, an additional description will be omitted to avoid redundancy. The plurality of flash translation layer accelerators FTLA0 to FTLA3 may manage the memory devices NVM through a plurality of channels. For example, the 0-th flash translation layer accelerator FTLA0 may manage the nonvolatile memories NVM connected with the 0-th channel CH0. In an example embodiment of the inventive concept, the 0-th flash translation layer accelerator FTLA0 may perform various maintenance operations, which are associated with the nonvolatile memories NVM connected with the 0-th channel CH0, such as logical-physical mapping table management, bad block management, and wear leveling. The first flash translation layer accelerator FTLA1 may manage the nonvolatile memories NVM connected with the first channel CH1. The second flash translation layer accelerator FTLA2 may manage the nonvolatile memories NVM connected with the second channel CH2. The third flash translation layer accelerator FTLA3 may manage the nonvolatile memories NVM connected with the third channel CH3.

Functions of the flash translation layer accelerators FTLA0 to FTLA3 may be similar to those of the flash translation layers FTL0 to FTL3 of FIG. 1. In contrast, unlike the flash translation layers FTL0 to FTL3, the flash translation layer accelerators FTLA0 to FTLA3 may be implemented with hardware.

Figure 15:
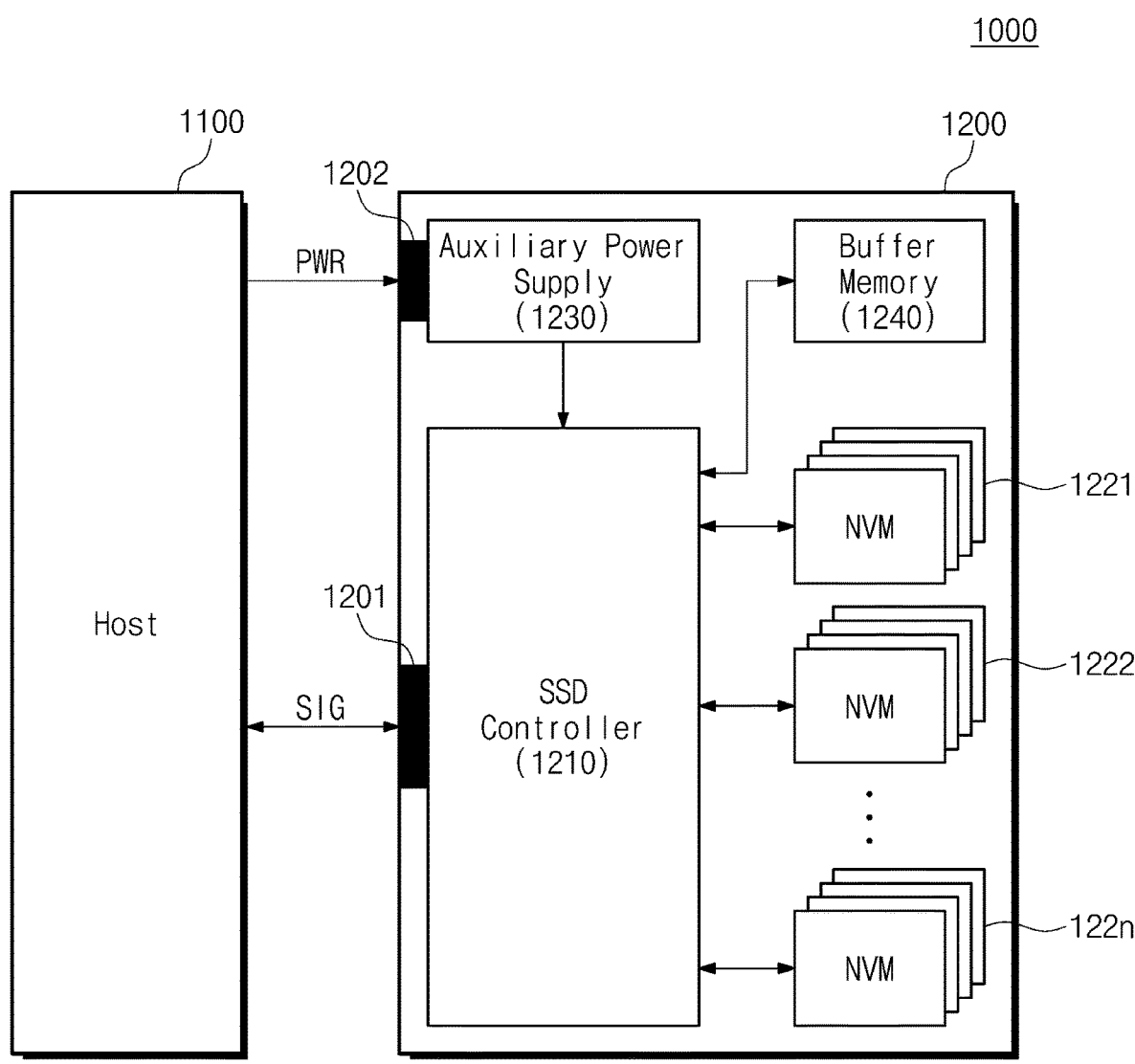
FIG. 15 is a block diagram illustrating a solid state drive system to which a storage system according to an example embodiment of the inventive concept is applied.

FIG. 15 is a block diagram illustrating a solid state drive (SSD) system to which a storage system according to an example embodiment of the inventive concept is applied. Referring to FIG. 16, an SSD system 1000 includes a host 1100 and an SSD 1200.

The SSD 1200 exchanges signals SIG with the host 1100 through a signal connector 1201 and is supplied with a power PWR through a power connector 1202. In an example embodiment of the inventive concept, the signal connector 1201 may be a PCIe port, the signals SIG may be signals defined in the NVMe protocol, and the SSD 1200 may be an NVMe-based storage device. The SSD 1200 includes an SSD controller 1210, a plurality of flash memories 1221 to 122n, an auxiliary power supply 1230, and a buffer memory 1240. In an example embodiment of the inventive concept, each of the plurality of flash memories 1221 to 122n may be implemented with a separate chip or a separate package, and the plurality of flash memories 1221 to 122n may be recognized as a plurality of groups by the SSD controller 1210.

The SSD controller 1210 may control the plurality of flash memories 1221 to 122n in response to the signals SIG received from the host 1100. In an example embodiment of the inventive concept, the SSD controller 1210 may operate based on the operation methods described with reference to FIGS. 1 to 14.

The plurality of flash memories 1221 to 122n may operate under control of the SSD controller 1210. The auxiliary power supply 1230 is connected with the host 1100 through the power connector 1202. The auxiliary power supply 1230 may be charged by the power PWR supplied from the host 1100. When the power PWR is not smoothly supplied from the host 1100, the auxiliary power supply 1230 may power the SSD 1200.

According to an example embodiment of the inventive concept, a storage device providing stabilized performance or increased reliability by scrambling a logical address and an operation method of the storage device are provided.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. A storage controller, comprising:
a host interface circuit configured to receive a first request, a second request, a third request, and a fourth request respectively corresponding to a first logical address, a second logical address, a third logical address, and a fourth logical address from a host device;
a memory interface circuit configured to communicate with one or more first nonvolatile memories through at least one first channel and communicate with one or more second nonvolatile memories through at least one second channel;
a first flash translation layer configured to manage the one or more first nonvolatile memories; and
a second flash translation layer configured to manage the one or more second nonvolatile memories,
wherein the first flash translation layer outputs commands respectively corresponding to the first and fourth requests through the at least one first channel, and the second flash translation layer outputs commands respectively corresponding to the second and third requests through the at least one second channel, and
wherein a value of the first logical address is smaller than a value of the second logical address, and a value of the third logical address is smaller than a value of the fourth logical address,
wherein each of the first, second, third and fourth logical addresses includes a first address part, a second address part, and a third address part,
wherein a value of the second address part of the first logical address is equal to a value of the second address part of the third logical address, and a value of the second address part of the second logical address is equal to a value of the second address part of the fourth logical address, and
wherein the storage controller further comprises:
a scramble circuit, wherein the scramble circuit includes:
a first XOR operator configured to perform a logical operation on the first address pa of each of the first, second, third and fourth logical addresses and a seed;
a hash module configured to generate a hash value by performing a hash operation on an output of the first XOR operator, and
a second XOR operator configured to generate a scrambled second address part for each of the first, second, third and fourth logical addresses by performing a logical operation on the second address part of each of the first, second, third and fourth logical addresses and the hash value corresponding thereto.

2. The storage controller of claim 1, wherein data respectively corresponding to the first and fourth requests are stored in a first buffer space of a buffer memory controlled by the first flash translation layer, and data respectively corresponding to the second and third requests are stored in a second buffer space of the buffer memory controlled by the second flash translation layer.

3. The storage controller of claim 1, wherein the hash module includes a cyclic redundancy check (CRC), an advanced encryption standard (AES), or a pseudo random number generator.

4. The storage controller of claim 1, wherein the seed is stored in a meta area of the one or more first nonvolatile memories, a meta area of the one or more second nonvolatile memories, an electrically erasable and programmable read only memory, an electronic fuse, a mask read only memory, or a serial programmable read only memory.

5. The storage controller of claim 1, wherein a value of a scrambled second address part of the first logical address is equal to a value of a scrambled second address part of the fourth logical address, and
wherein a value of a scrambled second address part of the second logical address is equal to a value of a scrambled second address part of the third logical address.

6. The storage controller of claim 1, wherein each of first, second, third and fourth scrambled logical addresses includes the first address part, the scrambled second address part, and the third address part, and
wherein the scramble circuit sends the first and fourth scrambled logical addresses to the first flash translation layer and sends the second and third scrambled logical addresses to the second flash translation layer.

7. The storage controller of claim 6, wherein a value of the second address section of each of the first, second, third and fourth logical addresses is stored in a meta area of the one or more first nonvolatile memories or a meta area of the one or more second nonvolatile memories.

8. An operation method of a storage controller, the method comprising:
receiving a write request including a logical address from a host device, the logical address including a first address part, a second address part, and a third address part;
performing an XOR operation on the first address part and a seed to generate a first intermediate value;
performing a hash operation on the first intermediate value to generate a second intermediate value;
performing an XOR operation on the second intermediate value and the second address part to generate a scrambled second address part; and
outputting a command corresponding to the write request based on the scrambled second address part to a first nonvolatile memory through a first channel or to a second nonvolatile memory through a second channel.

9. The method of claim 8, wherein a number of bits of the third address part corresponds to a page size of the first nonvolatile memory or the second nonvolatile memory, and a number of bits of the second address part corresponds to a number of flash translation layers.

10. The method of claim 9, further comprising:
generating a result value of a modulo operation: "the scrambled second address part" mod "the number of flash translation layers".

11. The method of claim 10, further comprising:
when the result value is a first value, sending the write request to a first flash translation layer of the flash translation layers; and
when the result value is a second value, sending the write request to a second flash translation layer of the flash translation layers.

12. The method of claim 10, further comprising:
when the result value is a first value, storing data corresponding to the write request in a first buffer space of a buffer memory controlled by a first flash translation layer of the flash translation layers; and
when the result value is a second value, storing the data corresponding to the write request in a second buffer space of the buffer memory controlled by a second flash translation layer of the flash translation layers.

13. The method of claim 10, further comprising:
when the result value is a first value, outputting data stored in a first buffer space of a buffer memory controlled by a first flash translation layer of the flash translation layers to the first nonvolatile memory through the first channel; and
when the result value is a second value, outputting data stored in a second buffer space of the buffer memory controlled by a second flash translation layer of the flash translation layers to the second nonvolatile memory through the second channel.

14. The method of claim 8, further comprising:
storing a value of the second address part in a meta area of the first nonvolatile memory or the second nonvolatile memory.

15. The method of claim 8, further comprising:
changing a value of the seed when a format command is received from the host device.

16. The method of claim 8, further comprising:
generating a value of the seed in an initialization operation.

17. The method of claim 16, wherein, in the initialization operation, the value of the seed is stored in a meta area of the first nonvolatile memory, a meta area of the second nonvolatile memory, an electrically erasable and programmable read only memory, an electronic fuse, a mask read only memory, or a serial programmable read only memory.

18. A storage controller, comprising:
a host interface circuit receiving a write request including a logical address from a host device, the logical address including a first address part, a second address part, and a third address part;
a scramble circuit that includes: a first XOR circuit performing an XOR operation on the first address part and a seed to generate a first intermediate value; a hash circuit performing a hash operation on the first intermediate value to generate a second intermediate value; and a second XOR circuit performing an XOR operation on the second intermediate value and the second address part to generate a scrambled second address part; and a memory interface circuit outputting a command corresponding to the write request based on the scrambled second address part to a first nonvolatile memory through a first channel or to a second nonvolatile memory through a second channel.

* * * * *